United States Patent
Oh et al.

(10) Patent No.: US 11,551,884 B2
(45) Date of Patent: Jan. 10, 2023

(54) SAFETY SWITCH

(71) Applicant: Keyence Corporation, Osaka (JP)

(72) Inventors: Choryon Oh, Osaka (JP); Yu Babasaki, Osaka (JP); Lye Tatt Cheah, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 1008 days.

(21) Appl. No.: 16/270,613

(22) Filed: Feb. 8, 2019

(65) Prior Publication Data

US 2019/0316381 A1 Oct. 17, 2019

(30) Foreign Application Priority Data

Apr. 13, 2018 (JP) .............................. JP2018-077633

(51) Int. Cl.
| | |
|---|---|
| *H01H 9/28* | (2006.01) |
| *F16P 3/08* | (2006.01) |
| *H01H 9/22* | (2006.01) |
| *H01H 27/00* | (2006.01) |

(52) U.S. Cl.
CPC .............. *H01H 9/285* (2013.01); *F16P 3/08* (2013.01); *H01H 9/22* (2013.01); *H01H 2027/005* (2013.01)

(58) Field of Classification Search
CPC .... H01H 9/285; H01H 9/22; H01H 2027/005; F16P 3/08; E05Y 2900/608; E05B 2047/0069; E05B 47/0046; E05B 47/0004
See application file for complete search history.

(56) References Cited

U.S. PATENT DOCUMENTS

| | | | | |
|---|---|---|---|---|
| 5,861,786 A | * | 1/1999 | Laveau | H01H 27/007 |
| | | | | 335/189 |
| 6,409,083 B1 | | 6/2002 | Link | |
| 7,456,368 B2 | * | 11/2008 | Fukumoto | F16P 3/08 |
| | | | | 200/43.04 |
| 7,563,995 B2 | * | 7/2009 | Jones | H01H 9/22 |
| | | | | 200/43.07 |

(Continued)

FOREIGN PATENT DOCUMENTS

| | | |
|---|---|---|
| GB | 2538840 A | 11/2016 |
| JP | 2006120459 A | 5/2006 |
| JP | 2008218162 A | 9/2008 |

OTHER PUBLICATIONS

U.S. Appl. No. 16/270,612, filed Feb. 8, 2019 (58 pages).

(Continued)

*Primary Examiner* — Edwin A. Leon
(74) *Attorney, Agent, or Firm* — Kilyk & Bowersox, P.L.L.C.

(57) ABSTRACT

To realize both toughness and size reduction of a safety switch. A safety switch is a safety switch into and from which a bolt of an actuator is inserted and pulled out. The safety switch includes a casing having a shape elongated along a first direction, a metal head having a receiving space for receiving the bolt of the actuator and provided on a first end side of the casing in the first direction, a detector for detecting a first state in which the bolt is received in the receiving space, a lock mechanism, a switching device and a first attachment portion provided in the head and having a first attachment hole into which a first attachment member is inserted.

11 Claims, 16 Drawing Sheets

(56) References Cited

U.S. PATENT DOCUMENTS

| | | |
|---|---|---|
| 8,494,680 B2 | 7/2013 | Sparenberg et al. |
| 9,819,342 B2 | 11/2017 | Pizzato |
| 10,049,843 B2 | 8/2018 | Pizzato |
| 2006/0090992 A1 | 5/2006 | Takenaka et al. |
| 2016/0133416 A1 | 5/2016 | Pizzato |
| 2016/0260565 A1 | 9/2016 | Link et al. |

OTHER PUBLICATIONS

Office Action issued in corresponding Japanese Patent Application 2018-077633 dated Feb. 21, 2022 (English translation only) (5 pages).

\* cited by examiner

FIG. 11A
FIG. 11B
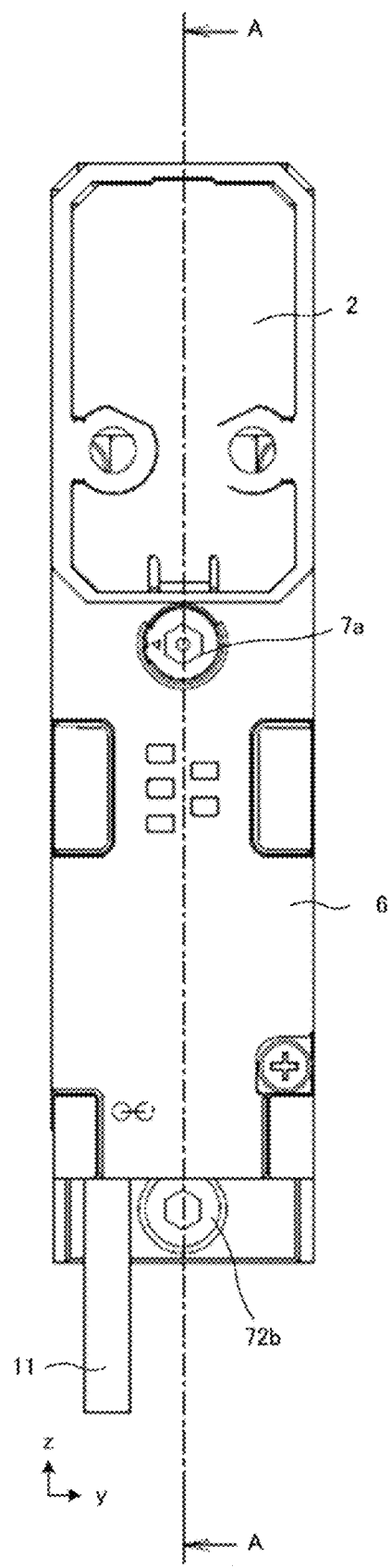
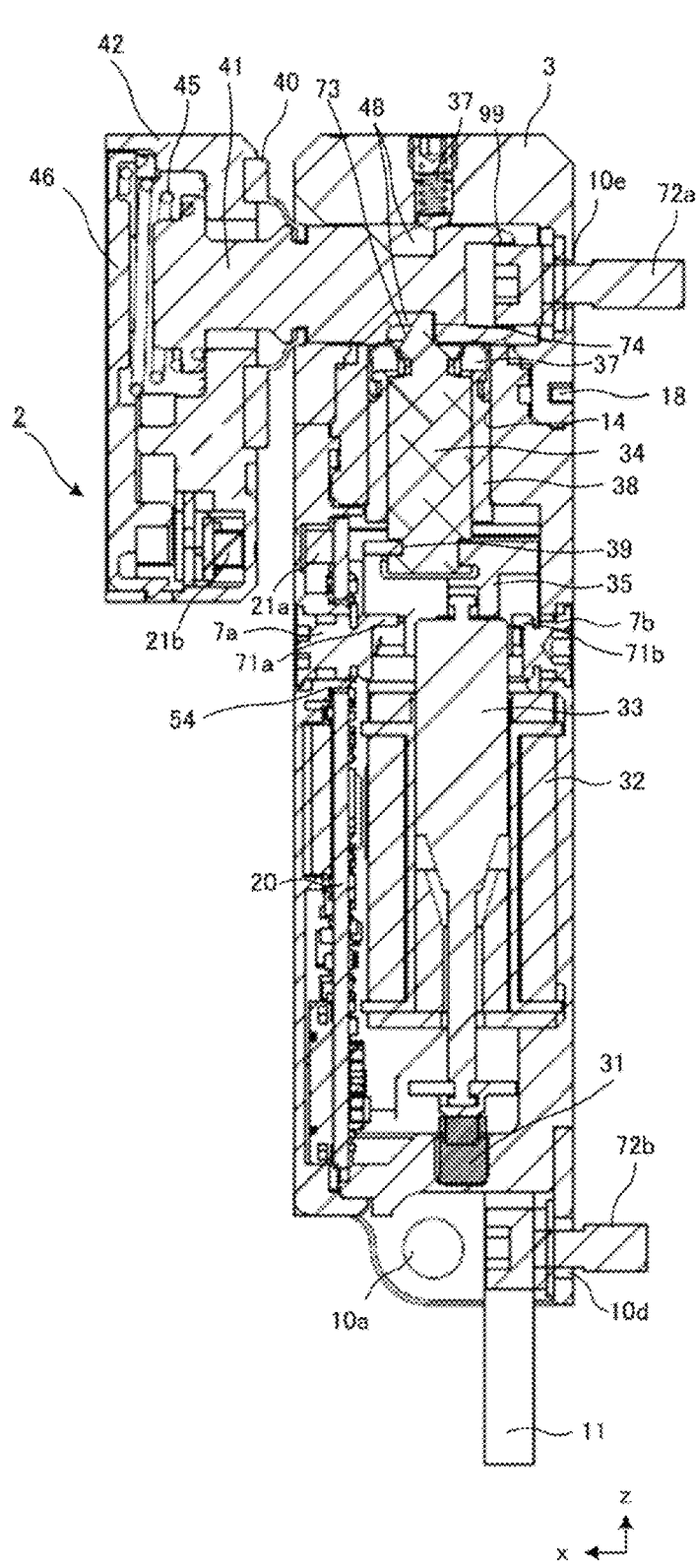

SAFETY SWITCH

CROSS-REFERENCE TO RELATED APPLICATIONS

The present application claims foreign priority based on Japanese Patent Application No. 2018-077633, filed Apr. 13, 2018, the contents of which is incorporated herein by reference.

BACKGROUND OF THE INVENTION

1. Field of the Invention

The present invention relates to a safety switch.

2. Description of Related Art

In order to avoid contact with a hazard source by an operator at a factory or the like, the hazard source is surrounded by a fence or a cover. In the fence, a door through which the operator enters and exits is provided. Moreover, a safety switch is provided in the door. The safety switch is a switch that locks the door while the hazard source is operated and that releases locking of the door when the hazard source is stopped.

That is, the safety switch maintains a stopped state of the hazard source while the door is opened and shifts the state of the hazard source to an operable state when the door is closed. According to JP-T-2002-501698 (Patent Literature 1) and JP-A-2011-058354 (Patent Literature 2), detection of opening/closing of the door using the principle of electromagnetic induction is proposed.

SUMMARY OF THE INVENTION

In general, a safety switch with a lock mechanism locks an actuator when the actuator is inserted into a body of the safety switch so that the actuator is not pulled out. Therefore, a certain degree of toughness is required for the body of the safety switch with respect to a pull-out force of the actuator in a locked state. However, it is difficult to reduce size reduction when giving priority to the toughness and it is difficult to secure the toughness when giving priority to the size reduction. Accordingly, an object of the present invention is to realize both toughness and size reduction in the safety switch.

A safety switch according to a first aspect of the present invention is a safety switch including a casing having an approximately rectangular parallelepiped shape, a metal head provided on a first end side in a longitudinal direction of the casing, a metal bottom portion provided on a second end side in the longitudinal direction of the casing, a first attachment portion provided in the head and having a first attachment hole into which a screw screwing to an external member is inserted, a second attachment portion provided in the bottom portion and having a second attachment hole into which a screw screwing to the external member is inserted.

According to the present invention, it is possible to realize both toughness and size reduction of the safety switch.

BRIEF DESCRIPTION OF THE DRAWINGS

FIGS. 11A and 11B are views for explaining operation of a lock pin.

DESCRIPTION OF EMBODIMENTS

Figure 1A:
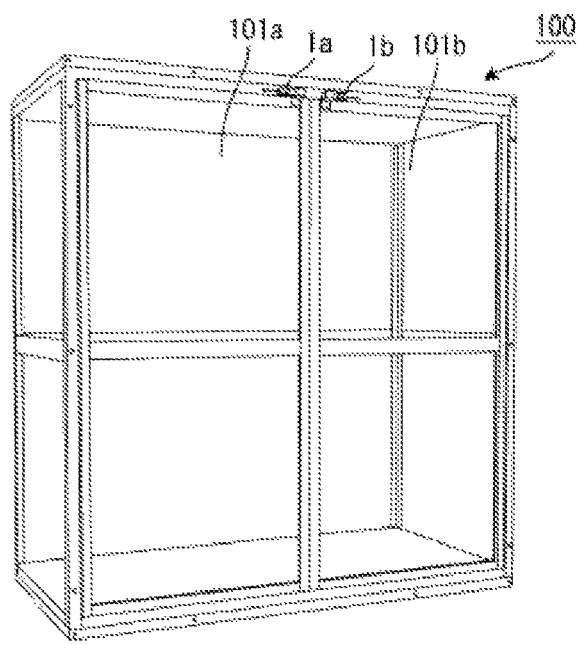
FIGS. 1A to 1C are views showing an example to which a safety switch is applied.
Figure 1B:
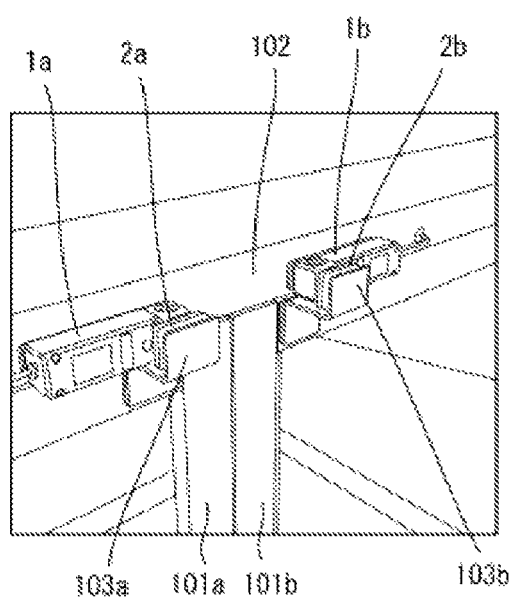
Figure 1C:
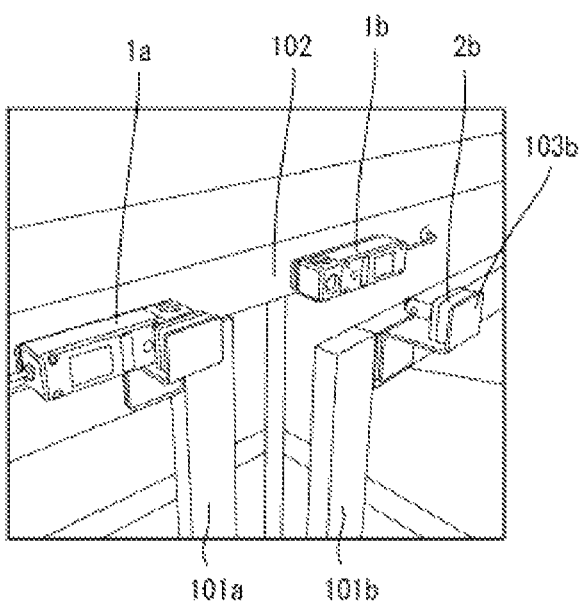
Figure 10:
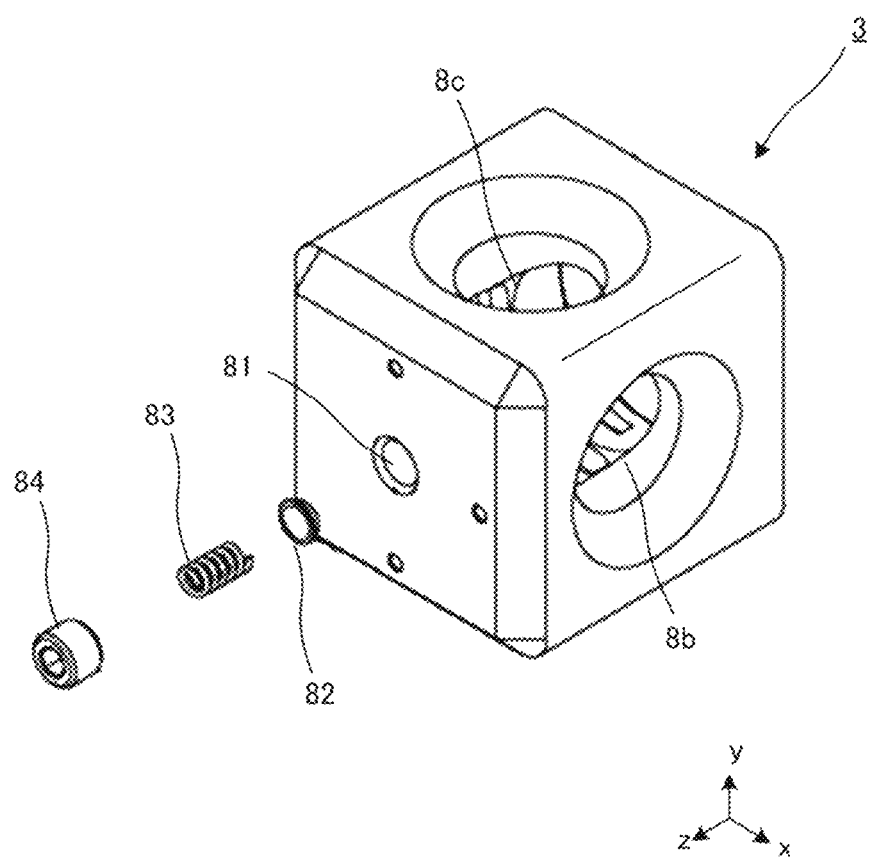
FIG. 10 is a view for explaining a cap.

<Mechanical Structure of Safety Switch>
FIGS. 1A to 1C show an example to which a safety switch 1 is applied. The safety switch 1 may be called a safety door switch. In this example, a surrounding box 100 surrounding a hazard source such as a machine tool is shown. The surrounding box 100 includes a left door 101a and a right door 101b as double doors. In an upper right part of the left door 101a, a safety switch 1a is provided. In an upper left part of the right door 101b, a safety switch 1b is provided. Lowercase alphabet characters following reference numerals are used for distinguishing the same or similar plural members. In a case where items common to plural members are explained, lowercase alphabet characters are omitted. As shown in FIGS. 1B and 10, bodies of the safety switches 1a and 1b are fixed to a door frame 102 of the surrounding box 100. An actuator 2a of the safety switch 1a is fixed to a support member 103a fixed to the left door 101a. An actuator 2b of the safety switch 1b is fixed to a support member 103b fixed to the right door 101b. As shown in FIG. 1B, when both of the left door 101a and the right door 101b are closed, the machine tool surrounded by the surrounding box 100 can be operated. As shown in FIG. 10, when at least one of the left door 101a and the right door 101b is opened, the machine tool surrounded by the surrounding box 100 is not capable of being operated. The surrounding box 100 is just an example, and may be replaced with a combination of an iron fence and a door. In this case, the safety switch 1 is fixed to a door frame of the iron fence, and the actuator 2 is fixed to the door.

Figure 2A:
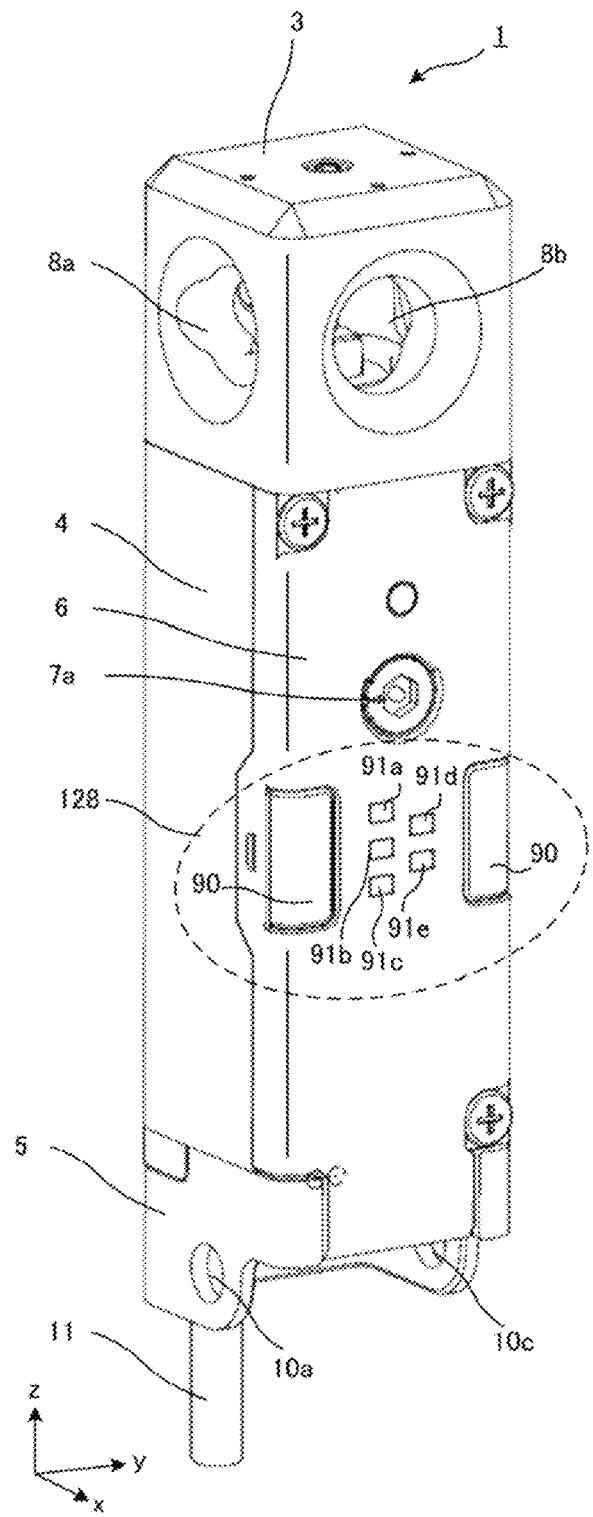
FIGS. 2A and 2B are perspective views showing a body of the safety switch.
Figure 2B:
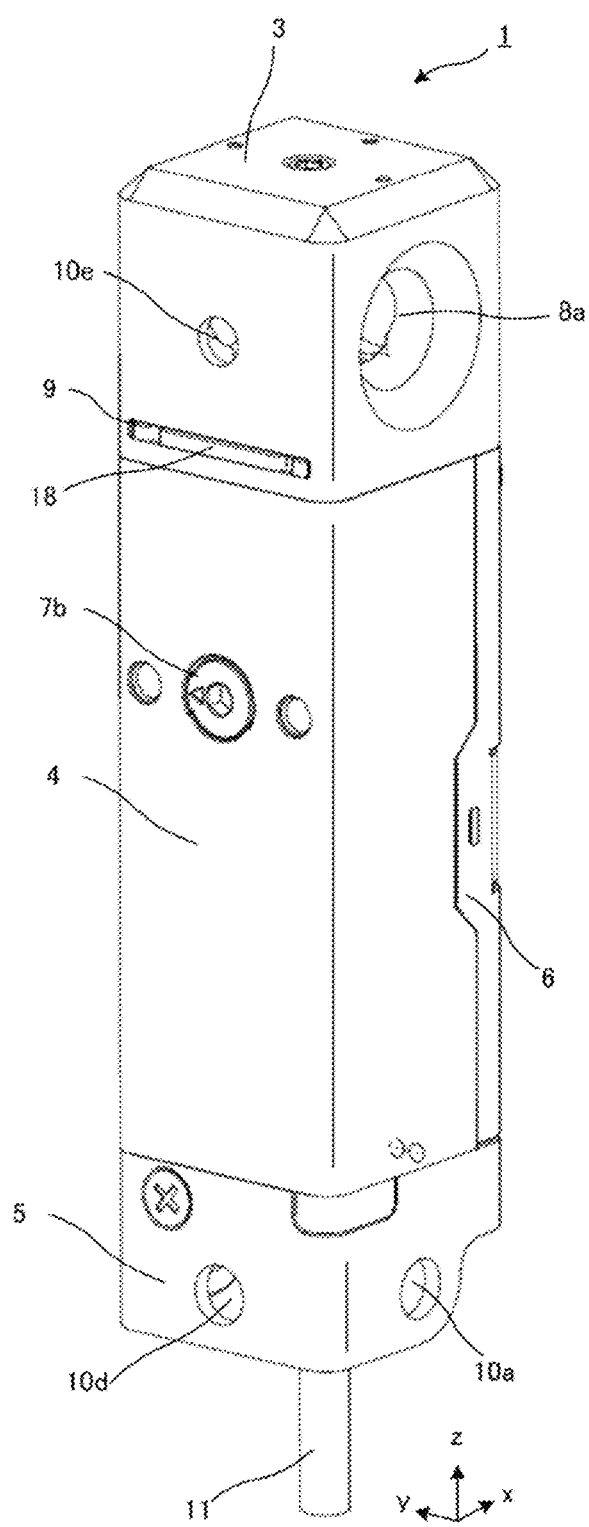

FIGS. 2A and 2B are perspective views showing a body of the safety switch 1. An arrow "z" shows a height direction (longitudinal direction). An arrow "y" shows a width direction (short-side direction). An arrow "x" shows a depth direction. A cap 3 is formed of a metal member. A receiving hole 8a is provided on a first side surface of the cap 3. A receiving hole 8b is provided on a second side surface of the cap 3. A receiving hole 8c is provided on a third side surface of the cap 3 (FIG. 3D). A screw hole 10e is provided on a fourth side surface of the cap 3. On the fourth side surface of the cap 3, a slit 9 for inserting a cap retainer 18 is also provided. The cap retainer 18 is a retaining ring for preventing the cap 3 from falling off from a body case 4. The body case 4 is made of metal or resin. The body case 4 has a window on a second side surface side, and the window is sealed with a cover 6. A circular hole is provided in the window cover 6, into which an unlock member 7a is inserted. A circular hole is also provided on a fourth side surface of the body case 4, into which an unlock member 7b is inserted. The unlock members 7a and 7b are used as release keys. A fixing member 5 made of metal is connected to a lower part of the body case 4. A screw hole 10a is provide on a first side surface of the fixing member 5. A screw hole 10c is provided on a third side surface of the fixing member 5. A screw hole 10d is provided on a fourth side surface of the fixing member 5. The cap 3 is capable of rotating around the longitudinal direction of the safety switch 1 as a rotation axis. Accordingly, the fourth side surface of the cap 3 is parallel to the first side surface of the fixing member 5 or the fourth side surface of the cap 3 is parallel to the third side surface of the fixing member 5. In FIG. 2B, the fourth side surface of the cap 3 is parallel to the fourth side surface of the fixing member 5. When the cap 3 is capable of rotating as described above, a fixing surface to the door frame or the like can be switched. A cable 11 is extended downward from a bottom surface of the body case 4. The cable 11 includes a signal line for transmitting a safety signal and the like.

A display unit 128 includes two large display lamps 90 and five small display lamps 91a to 91e for displaying states of the safety switch 1.

Figure 3A:
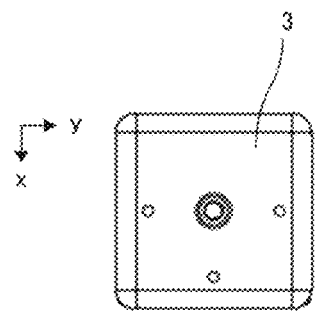
FIGS. 3A to 3E are views for explaining an external appearance of the safety switch.
Figure 3B:
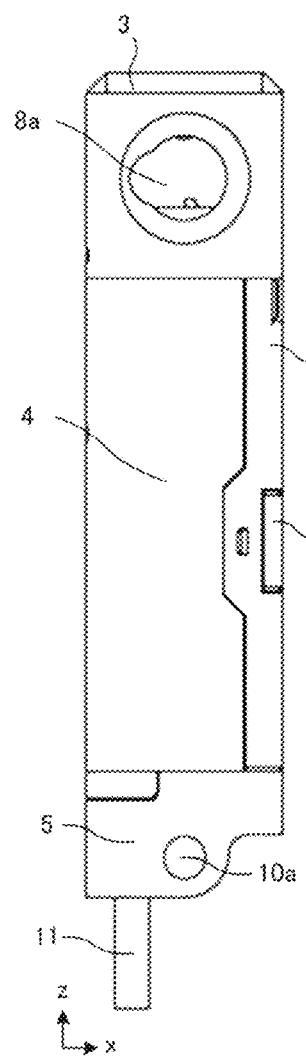
Figure 3C:
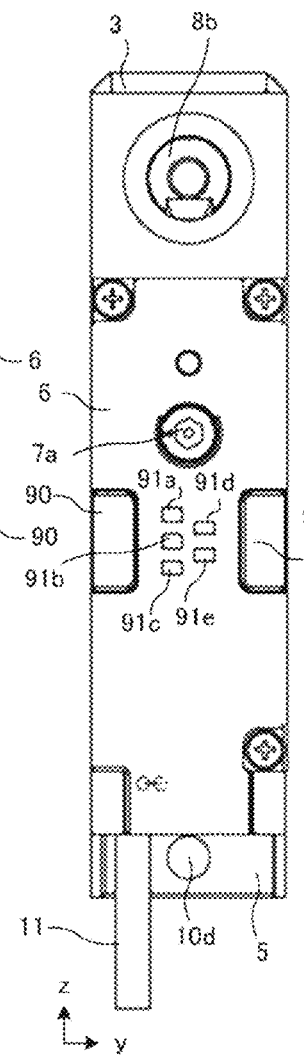
Figure 3D:
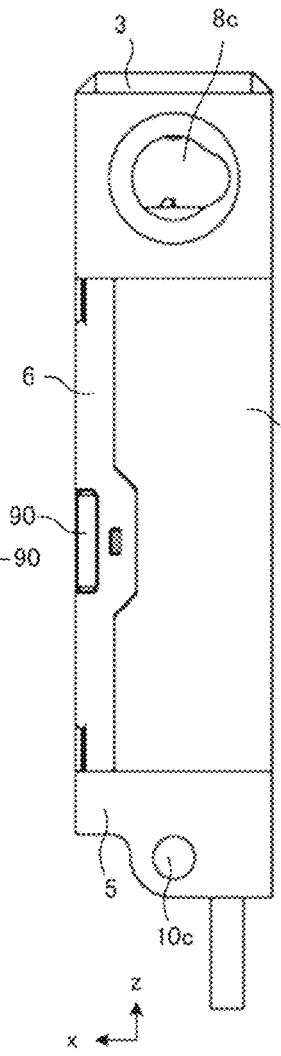
Figure 3E:
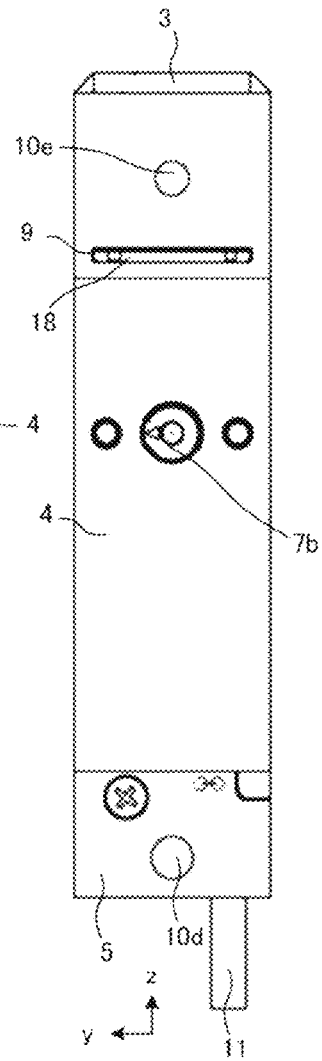

FIG. 3A shows a top surface of the cap 3. FIG. 3B shows a first side surface of the safety switch 1. One large display lamp 90 of the two large display lamp extends to the first side surface so as to be seen from the first side surface side. FIG. 3C shows a second side surface of the safety switch 1. One large display lamp 90 of the two large display lamps extends from the first side surface over the second side surface. The two large display lamps 90 are provided on the second side surface so as to be seen from the second side surface side. FIG. 3D shows a third side surface of the safety switch 1. The other large display lamp 90 of the two large display lamps 90 extends from the second side surface over the third side surface. Accordingly, the other large display lamp 90 can be seen also from the third side surface side. FIG. 3E shows a fourth side surface of the safety switch 1. In centers of the unlock members 7a and 7b, hexagonal holes to which a hexagonal wrench is fitted. As shown in FIG. 3C, the window cover 6 is fixed to the body case 4 by three screws. As shown in FIG. 3B to FIG. 3E, the cable 11 is led out from the casing at a position avoiding respective extended lines of the screw holes 10a, 10c and 10d. The cable is arranged at a position not crossing straight lines extending from respective centers of the screw holes 10a, 10c and 10d. The screw hole into which the screw is actually inserted in the screw holes 10a, 10c and 10d depends on the user of the safety switch 1. Therefore, the cable 11 is arranged at the position where the insertion of the screw is not interfered as well as fastening work by a screwdriver or a wrench for fixing the screw is not interfered whichever screw hole of the screw holes 10a, 10c and 10d is selected as the hole into which the screw is inserted. In this example, a lead-out hole of the cable is provided at one of four corners in the bottom surface of the casing.

Figure 4:
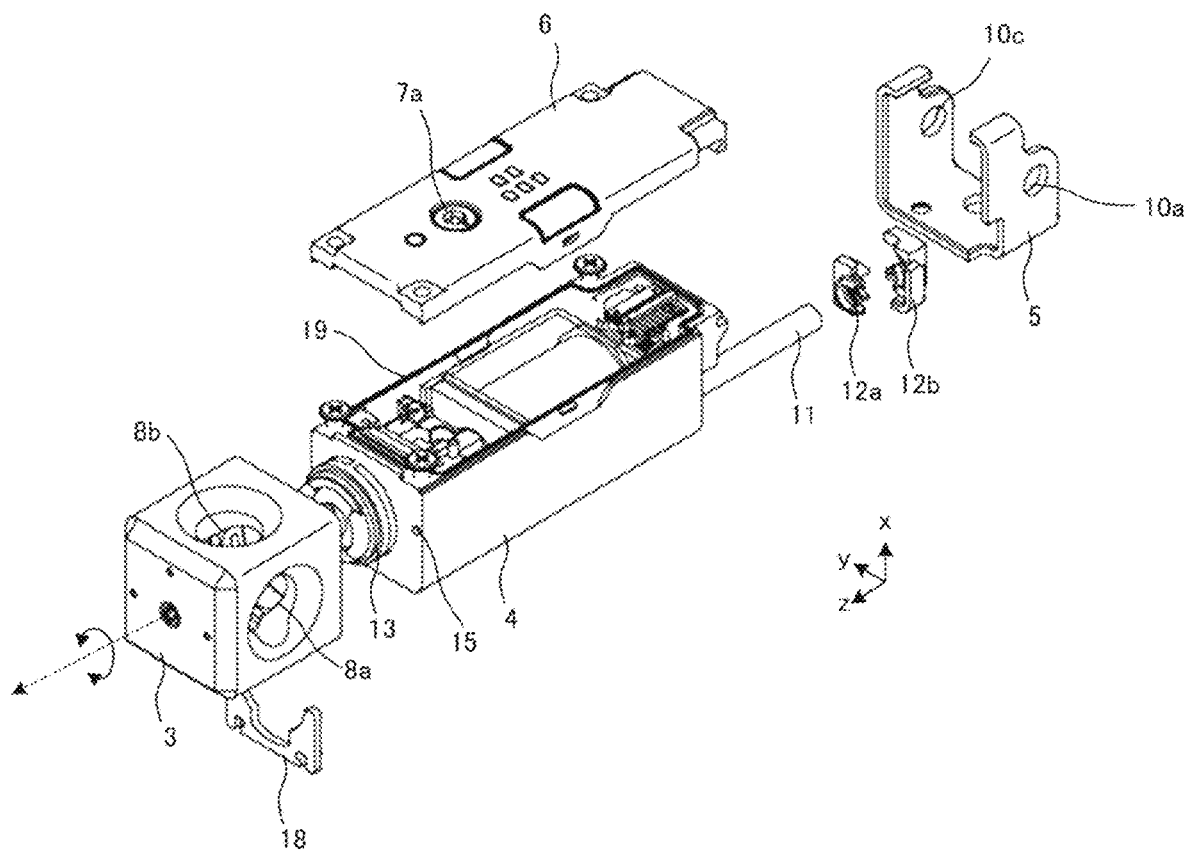
FIG. 4 is an exploded view showing the safety switch.

FIG. 4 is an exploded view of the safety switch 1. On a bottom surface of the cap 3, a circular hole to which a substantially cylindrical neck portion 13 is fitted is provided. A concave portion to which the cap retainer 18 is fitted is provided around the neck portion 13. When the cap retainer 18 is fitted to the concave portion of the neck portion 13, the cap 3 is not removed from the body case 4. As the neck portion 13 has a cylindrical shape and the hole on the bottom surface of the cap 3 has a circular shape, the cap 3 can rotate with respect to the body case 4. Three projections 15 are provided on a top surface of the body case 4. Three groove holes to which three projections 15 are respectively fitted are provided on a lower surface of the cap 3. Accordingly, the cap 3 is latched with respect to the body case 4 each time the cap 3 rotates by 90 degrees. In this example, the projections 15 are provided at positions on the top surface of the body case 4, which are a position close to the first side surface of the body case 4, a position close to the third side surface and a position close to the fourth side surface. Cable bushings 12a and 12b are split-type bushings that sandwich the cable 11 to support the cable 11. A window 19 is provided on the second side surface side of the body case 4. Though the cylindrical neck portion 13 is adopted in this case, a square pole shaped neck portion 13 may be adopted. A rectangular hole maybe provided on the bottom surface of the cap 3 so that the square pole shaped neck portion 13 can be fitted. In this case, the cap 3 may be removed from the neck portion 13, the cap 3 may be rotated with respect to the neck portion 13 by 90 degrees, 180 degrees or 270 degrees and the cap 3 may be fitted to the neck portion 13 again. Accordingly, the cap 3 may be rotated with respect to the neck portion 13 in units of 90 degrees.

Figure 5:
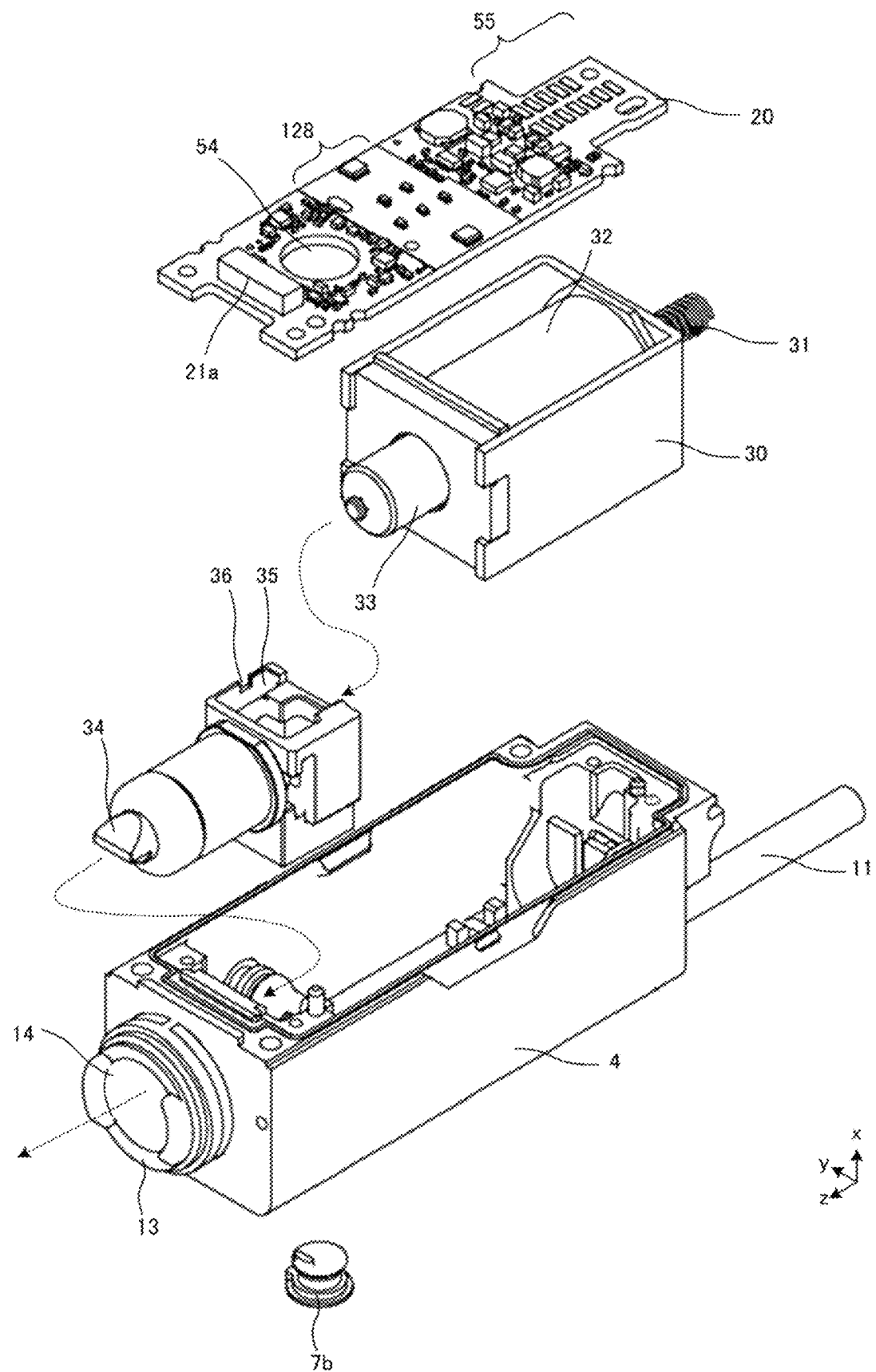
FIG. 5 is an exploded view showing the safety switch.

FIG. 5 shows members housed in the body case 4. A lock pin 34 is inserted through a hole 14 formed at a center of the neck portion 13. A coupler 35 is rigidly connected to the lock pin 34. In the coupler 35, a slit 36 used for detecting the position of the lock pin 34 is provided. When the slit 36 is positioned on an optical axis of light proceeding from a light emitting device to a light receiving device, the light receiving device can detect the light (lock state). On the other hand, when the slit 36 is not positioned on the optical axis, the light receiving device is not capable of detecting the light (unlock state). A solenoid pin 33 is rigidly connected to a bottom surface of the coupler 35. A spring 31 is provided on the bottom surface side of the solenoid pin 33. The spring 31 biases the solenoid pin 33 from the bottom surface side to the top surface side of the body case 4 (lock state). A solenoid 32 sucks the solenoid pin 33 against a biasing force of the spring 31 from the top surface side to the bottom surface side of the body case 4. Accordingly, the lock pin 34 connected to the solenoid pin 33 moves from the top surface side to the bottom surface side of the body case 4, therefore, locking of the actuator 2 is released. A circuit substrate 20 includes a processor circuit for driving the solenoid 32 or generating a safety signal, light sources for the display unit 128 (seven LEDs in total which are LEDs corresponding to two large display lamps 90 and LEDs corresponding to five small display lamps 91a to 91e), an antenna coil 21a, a hole 54 and so on. The antenna coil 21a is a coil for wirelessly transmitting electric power to the actuator 2 and for receiving a wireless signal transmitted from the actuator 2. As the window cover 6 is made of resin, the antenna coil 21a can perform wireless communication with the actuator 2 through the window cover 6. The circular hole 54 is a hole into which the unlock member 7a for forcibly making the state of the lock pin in the unlock state is inserted. The circuit substrate 20 has a terminal group 55 (plural input terminals and plural output terminals) connected to the cable 11.

Figure 6:
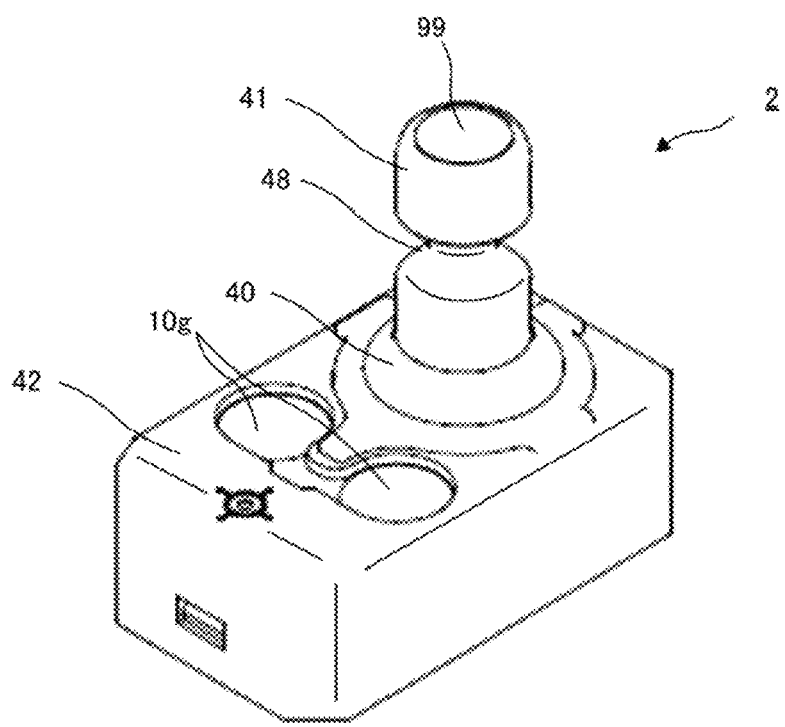
FIG. 6 is a perspective view showing an actuator.
Figure 7:
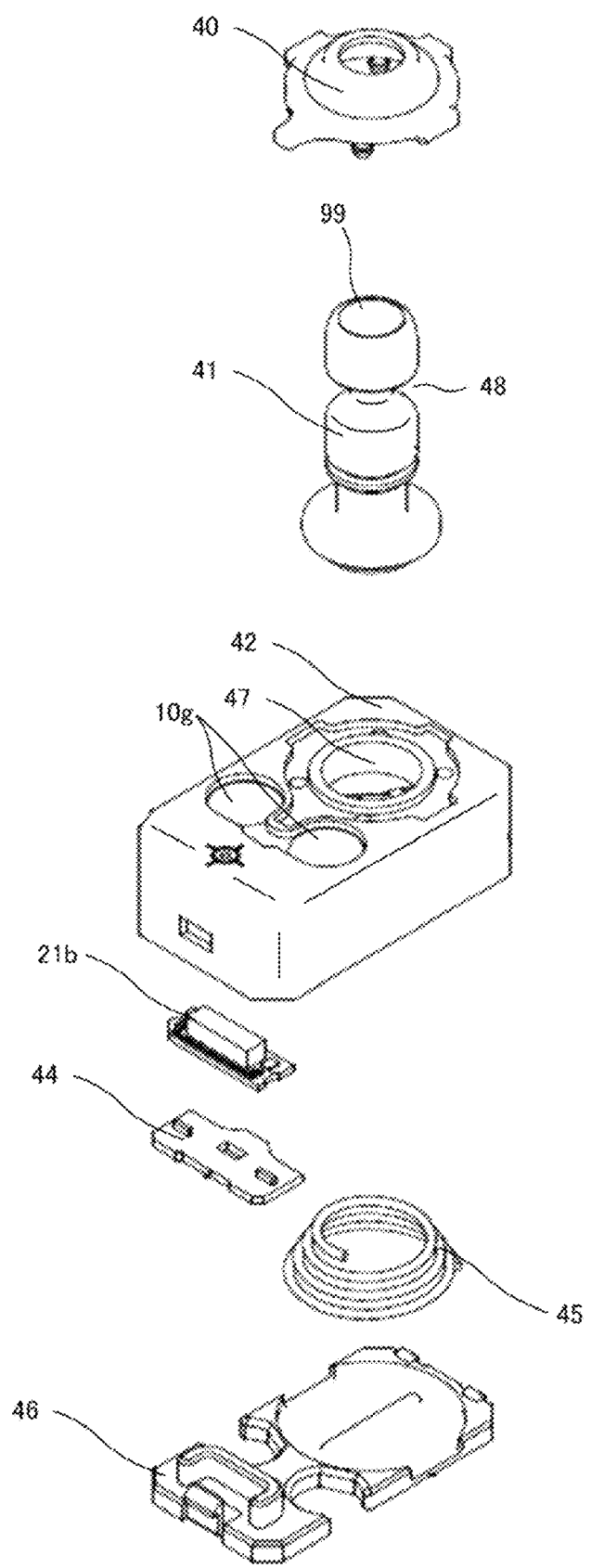
FIG. 7 is an exploded view showing the actuator.

FIG. 6 is a perspective view showing the actuator 2. FIG. 7 is an exploded view of the actuator 2. An actuator bolt 41 is a metal pin to be inserted into any of receiving holes 8a, 8b and 8c of the cap 3. The actuator bolt 41 includes a constricted part 48. The lock pin 34 is fitted to the constricted part 48 to thereby latch the actuator 2 to the cap 3. An actuator housing 42 has a circular hole 47. The actuator bolt 41 is inserted from below the actuator housing 42 into the hole 47 and a bellows 40. The bellows 40 is an elastic member made of resin or rubber having flexibility. A back cover 46 as a lid for the actuator housing 42 support a spring 45 and a presser member 44. The spring 45 is a biasing member adding a biasing force with respect to a bottom surface of the actuator bolt 41. The presser member 44 is a member supporting an antenna coil 21b. As the actuator bolt 41 is elastically supported by the bellows 40 and the spring 45, the actuator bolt 41 can move with respect to the actuator housing 42. As described above, the actuator 2 is fixed to the door 101 or the like, and the body of the safety body 1 is fixed to the door frame 102 or the like. The actuator 2 may have two screw holes 10g. The actuator 2 may be fixed to the door 101 or the like by screws inserted into the screw holes 10g. A hole 99 is provided at a tip end of the actuator bolt 41. The hole 99 is provided for avoiding contact between a head of a screw 72a (FIG. 11) for fixing the cap 3 to the door frame or the like and the actuator hole 41. Accordingly, dimensions of the safety switch 1 in a depth direction can be reduced.

Figure 8:
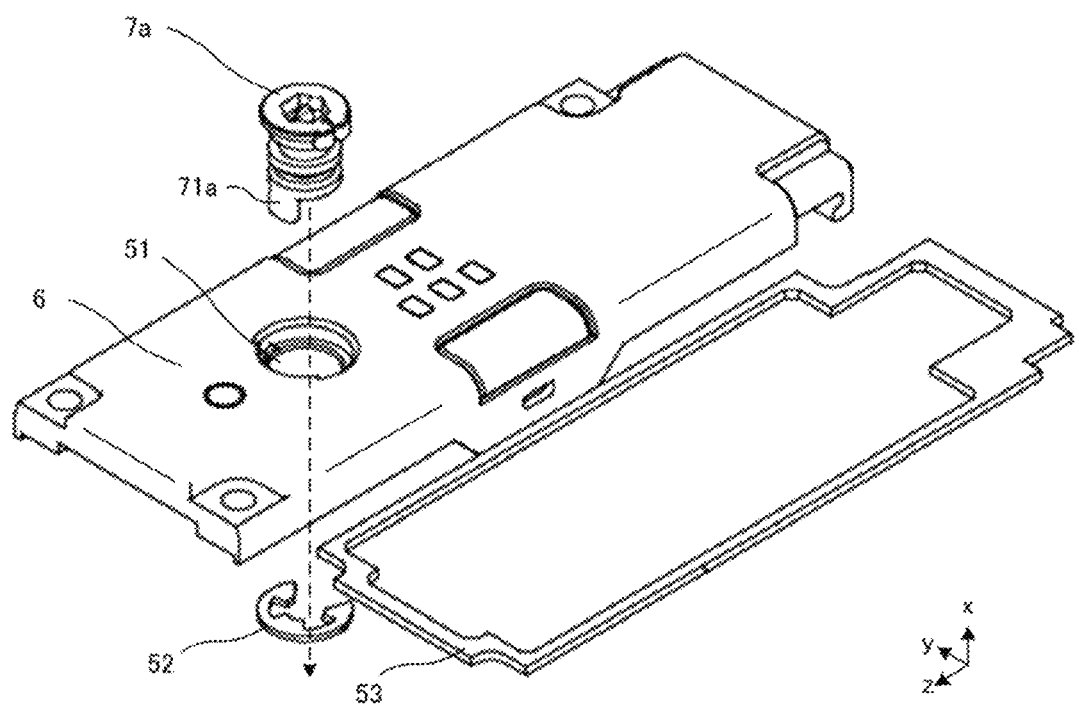
FIG. 8 is a view showing a window cover.

FIG. 8 is a view showing the details of the window cover 6. A circular hole 51 is provided in an approximately center of the window cover 6, into which the unlock member 7a is inserted. An engaging member 71a to be engaged with the coupler 35 is provided at a tip end of the unlock member 7a. A retaining ring 52 is a retaining ring fitted to a groove provided around the unlock member 7a. A seal member 53 is a member for reducing infiltration of liquid with respect to the body case 4.

Figure 9:
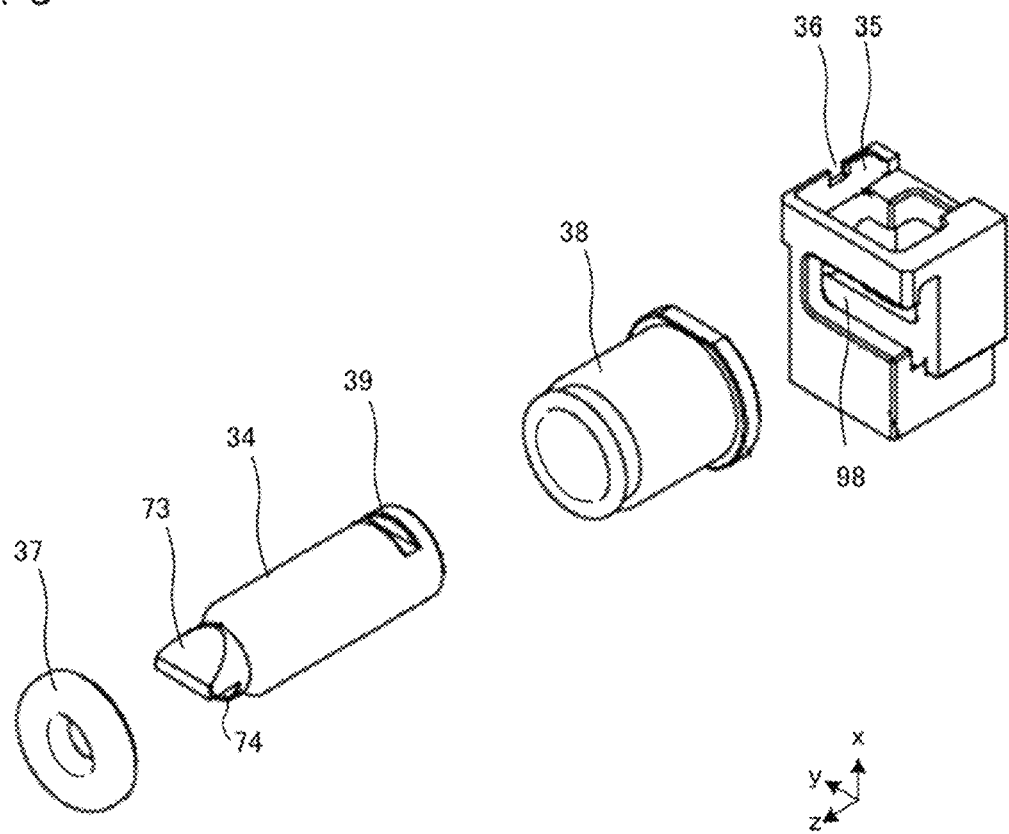
FIG. 9 is a view for explaining a lock pin module.

FIG. 9 shows a lock pin module. A first engaging surface 73 and a second engaging surface 74 engaged with the constricted part 48 of the actuator bolt 41 are formed at a tip end of the lock pin 34. An angle between the first engaging surface 73 and an xy plane is approximately 60 degrees. An angle between the second engaging surface 74 and the xy plane is approximately 90 degrees. The lock pin 34 is inserted into a pipe 38. At a tip end of the pipe 38, a bellows 37 is provided. The bellows 37 is fitted and fixed to the tip end portion of the pipe 38. For example, an end of the bellows 37 may be attached to the tip end of the pipe 38 and the other end of the bellows 37 may be attached to the lock pin 34. The lock pin 34 can slide with respect to the pipe 38. Accordingly, the bellows 37 extends and contracts as the lock pin 34 protrudes and retracts with respect to the pipe 38. Accordingly, it is possible to suppress intrusion of foreign matter to a sliding surface between the lock pin 38 and the lock pin 34. On a rear end of the lock pin 34, a groove 39 is provided. The groove 39 is fitted and fixed to a U-shaped retaining ring provided in the coupler 35.

FIG. 10 shows the details of the cap 3. A hole 81 is provided in a center on a top surface of the cap 3. A hemispherical latch pin 82, a latch spring 83 biasing the latch pin 82 and a set screw 84 for fixing the latch spring 83 to the cap 3 are fixed to the hole 81. The latch pin 82 is engaged with the constricted part 48 of the actuator bolt 41 to thereby position the actuator bolt 41.

FIG. 11A shows the safety switch 1 in a state where the actuator 2 is fitted to the cap 3. A screw 72b is inserted into the screw hole 10d of the fixing member 5. It is found that the cable 11 is arranged at the position not crossing the screw holes 10a and 10d also from the FIG. 11A and FIG. 11B. FIG. 11B shows the safety switch 1 taken along A-A cutting surface. The antenna coil 21b of the actuator 2 and the antenna coil 21a on the body case 4 side are arranged so as to face each other. The hole 99 for housing the head of the screw 72a is provided at the tip end of the actuator bolt 41. A jaw part is provided on a tip end side of the constricted part 48 of the actuator bolt 41. The jaw part is engaged with the lock pin 34. The solenoid pin 33 is biased toward an upper direction (z-direction) by the biasing force of the spring 31. The second engaging surface 74 provided at the tip end of the lock pin 34 rigidly connected to the solenoid pin 33 is engaged with the jaw part to lock the actuator bolt 41. Accordingly, the actuator bolt 41 is fixed to the cap 3. When the actuator bolt 41 is inserted into the receiving hole, the tip end of the actuator bolt 41 is engaged with the first engaging surface 73 of the lock pin 34 and climbs over the first engaging surface 73 while pressing the lock pin 34 downward. Note that the second engaging surface 74 may be called a surface having an inclination angle of 90 degrees. The first engaging surface 73 may be called a surface having an inclination angle of 60 degrees.

There are two methods for releasing locking of the actuator bolt 41. The first one is to move the lock pin 34 downward by sucking the solenoid pin 33 by the solenoid 32. The second one is to engage the engaging member 71 with the coupler 35 by rotating the unlock member 7 to forcibly move the coupler 35 and the solenoid pin 33 downward.

Figure 12:
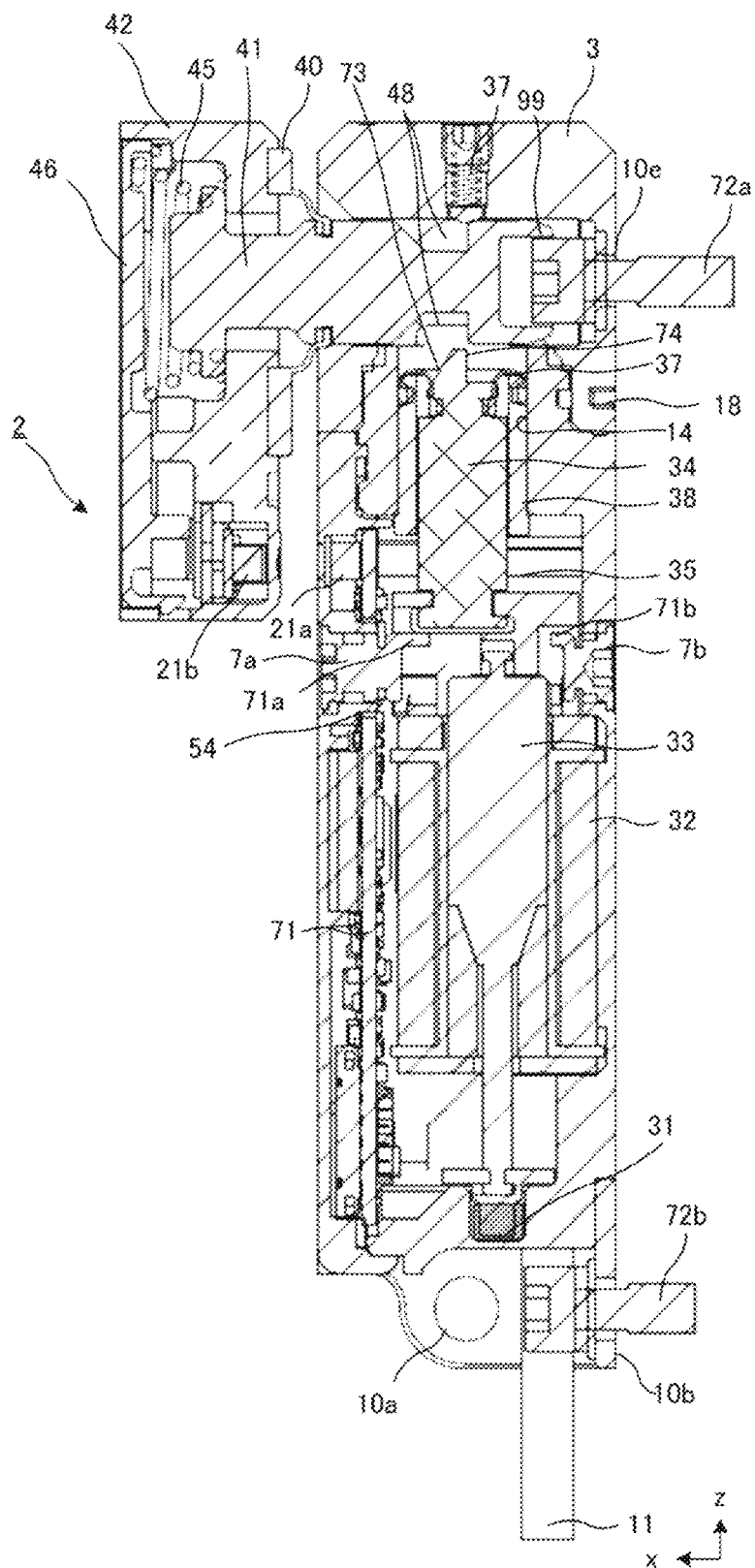
FIG. 12 is a view for explaining operation of the lock pin.

FIG. 12 shows a state where locking between the lock pin 34 and the actuator bolt 41 is released by sucking the solenoid pin 33 by the solenoid 32. Accordingly, the actuator bolt 41 can be pulled out freely.

Figure 13A:
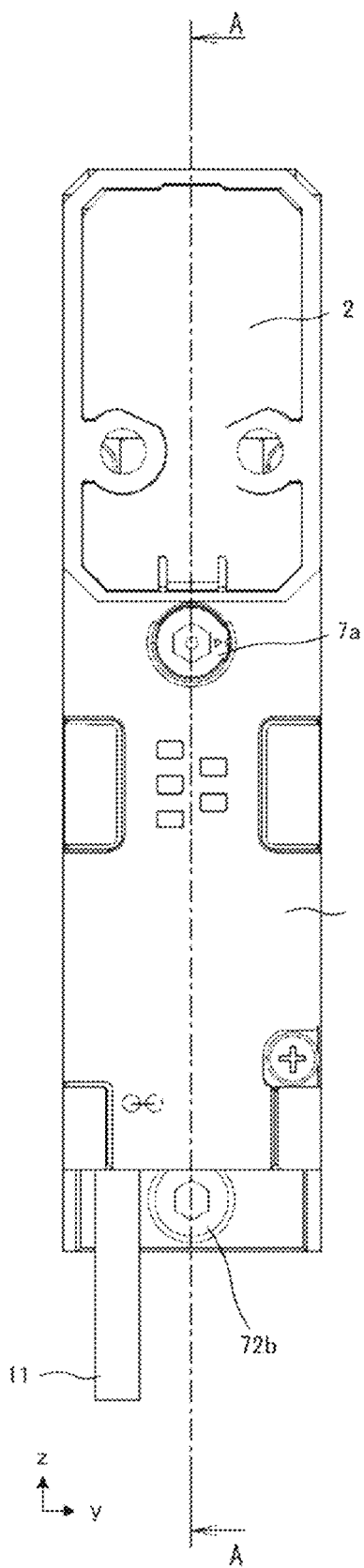
FIGS. 13A and 13B are views for explaining operation of the lock pin.
Figure 13B:
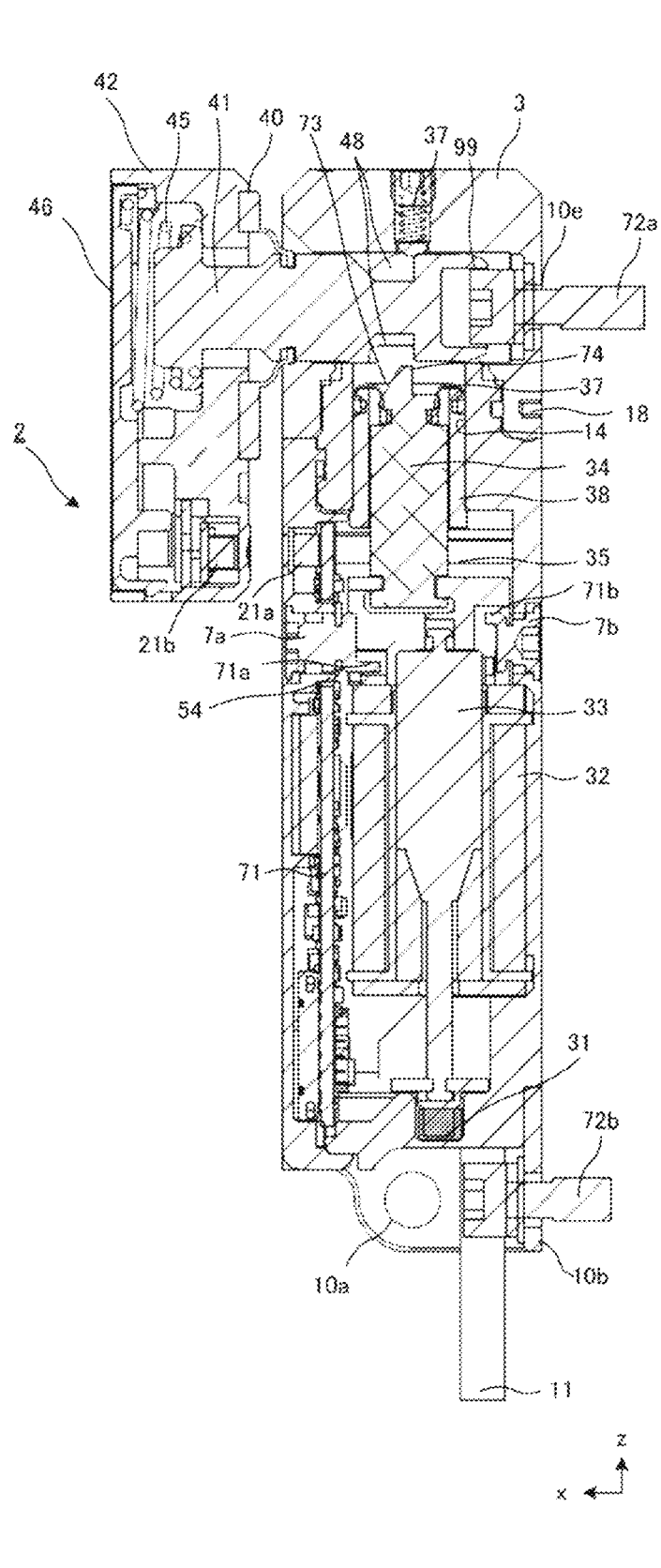

FIG. 13 shows a state where locking between the lock pin 34 and the actuator bolt 41 is released by rotating the unlock member 7a by 180 degrees. A rotation axis of the unlock member 7a is parallel to the x-direction. When the unlock member 7a is rotated by 180 degrees, the engaging member 71a positioned in an upper part moves to a lower part. Accordingly, the engaging member 71a is engaged with the coupler 35 and a force rotating the unlock member 7a is converted into a force pressing the coupler 35 downward. As a result, the engaging member 71a presses the coupler 35 downward. As the lock pin 34 is rigidly connected to the coupler 35, the lock pin 34 and the solenoid pin 33 move downward against the biasing force of the spring 31. Accordingly, locking between the lock pin 34 and the actuator bolt 41 is released and the actuator bolt 41 can be pulled out freely. Similarly, when the unlock member 7b is rotated by 180 degrees, an engaging member 71b presses the coupler 35 downward. Accordingly, locking between the lock pin 34 and the actuator bolt 41 is released.

<Electrical Configuration of Safety Switch>

Figure 14:
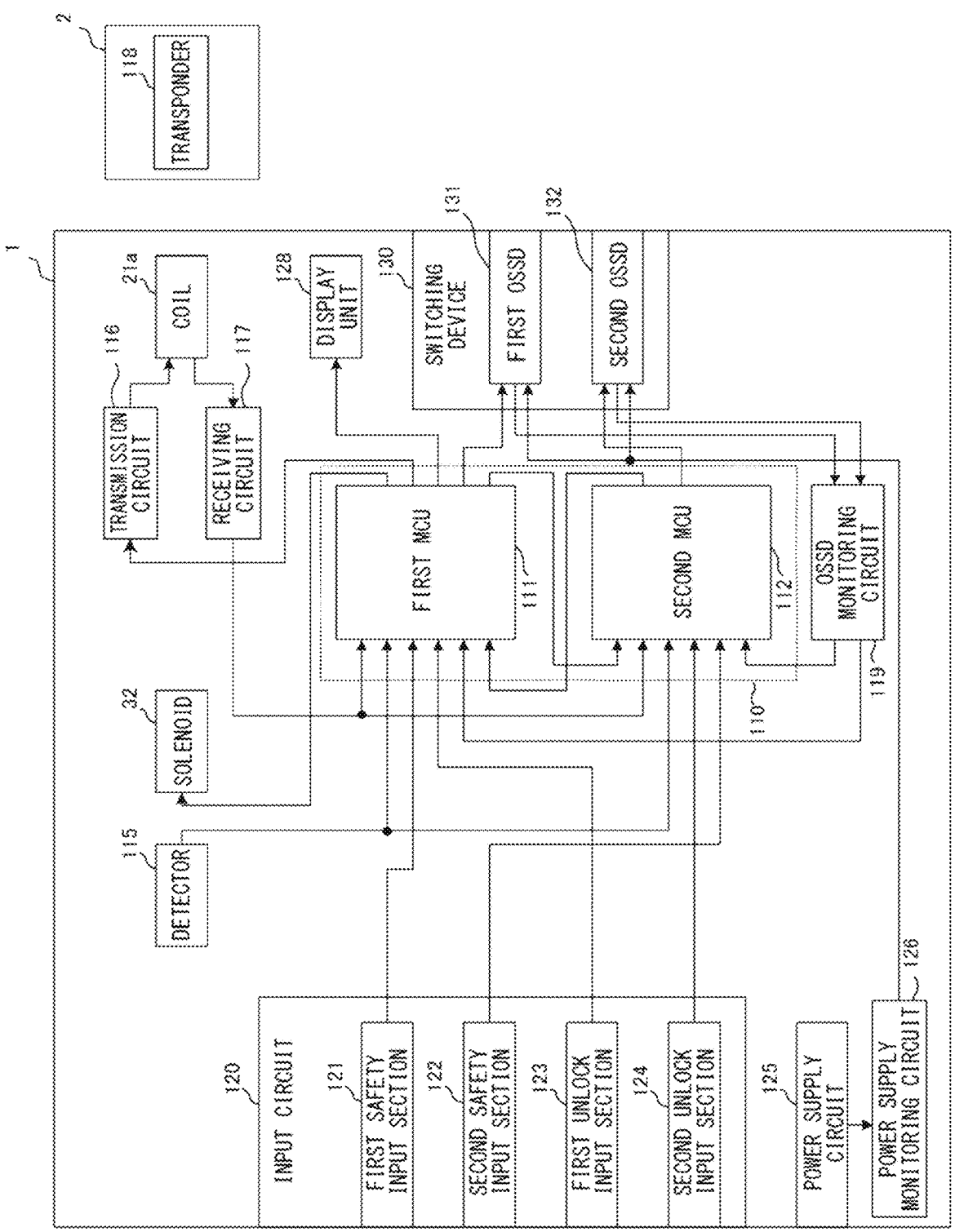
FIG. 14 is a block diagram showing an electrical configuration of the safety switch.
Figure 15:
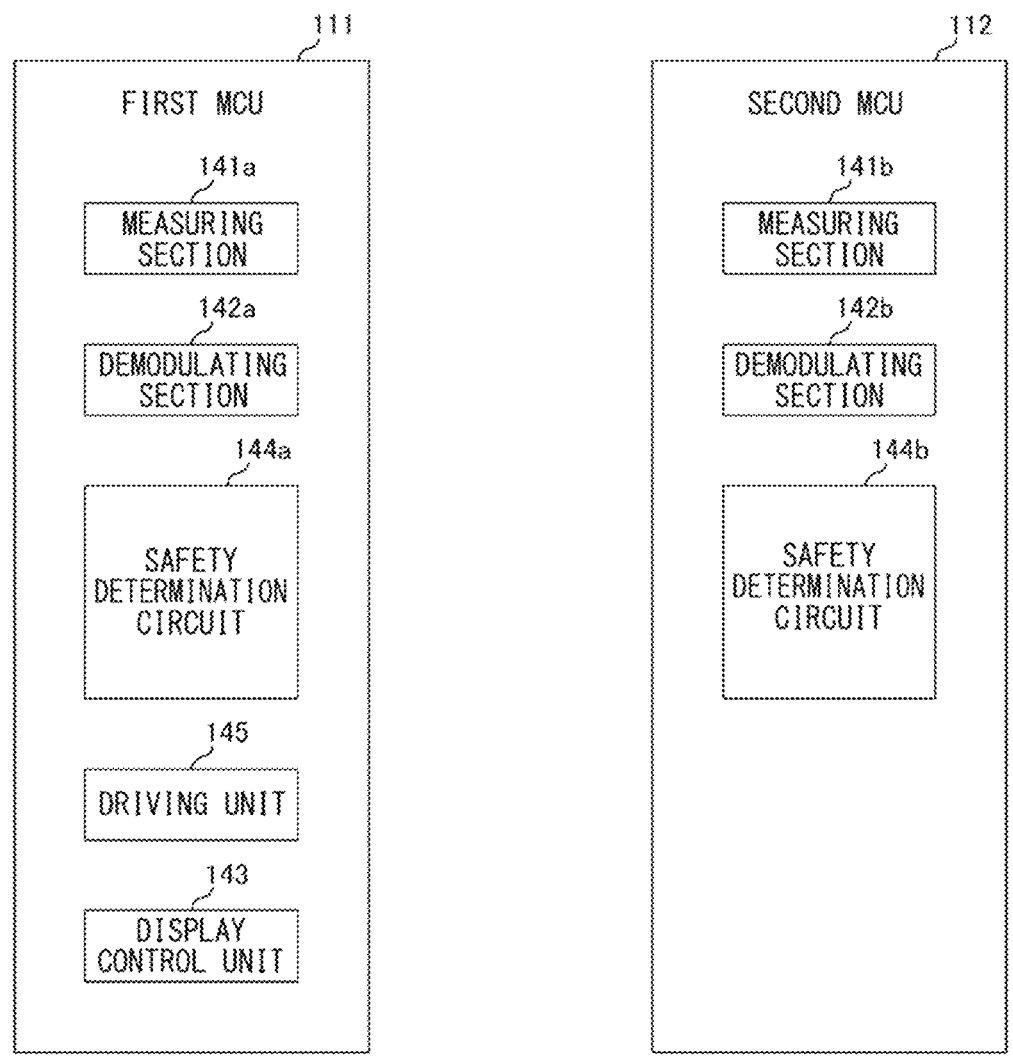
FIG. 15 is a block diagram showing functions of MCUs.

FIG. 14 shows an electrical configuration of the safety switch 1. FIG. 15 shows functions of MCUs (micro controller units). A control circuit 110 includes a first MCU 111 and a second MCU 112. The first MCU 111 and the second MCU 112 monitor each other by performing communication mutually.

The first MCU 111 is connected to a transmission circuit 116. The transmission circuit 116 is connected to the antenna coil 21a. The antenna coil 21a is connected to a receiving circuit 117. The receiving circuit 117 is connected to both of the first MCU 111 and the second MCU 112. The first MCU 111 drives the antenna coil 21a through the transmission circuit 116 to supply a wireless signal from the antenna coil 21a to a transponder 118. The first MCU 111 and the second MUC 112 receive the wireless signal from the transponder 118 through the antenna coil 21a and the receiving circuit 117. The transponder 118 includes the antenna coil 21b and a response circuit. The transponder 118 may be a wireless tag (RF-ID tag). The response circuit operates by using induction current generating in the antenna coil 21b as a power supply. The response circuit demodulates the wireless signal received by the antenna coil 21b to acquire information and further transmits a wireless signal (response signal) through the antenna coil 21b. A measuring section 141a of the first MCU 111 and a measuring section 141b of the second MCU 112 measure an intensity of the wireless signal received from the transponder 118 and estimate a distance from the body of the safety switch 1 to the actuator 2 based on the intensity of the wireless signal. The intensity of the wireless signal may be directly used for detecting the position of the actuator bolt 41 instead of the distance. A demodulating section 142a of the first MCU 111 and a demodulating section 142b of the second MCU 112 respectively demodulate information carried by the wireless signal received from the transponder 118 and identify the actuator 2 based on the information. The information may include specific identification information. A safety determination circuit 144a of the first MCU 111 determines whether the measured distance is equal to or lower than a threshold or not and transmits a determination result to the second MCU 112. Similarly, a safety determination circuit 144b of the second MCU 112 determines whether the measured distance is equal to or lower than a threshold or not and transmits a determination result to the first MCU 111. The safety determination circuit 144a of the first MCU 111 determines that the actuator 2 is in a state of being inserted into the cap 3 (door closed state) when the determination result by itself corresponds to the determination by the other MCU (both determine that the measured distance is within the threshold). Similarly, the safety determination circuit 144b of the second MCU 112 determines that the actuator 2 is in the state of being inserted into the cap 3 (door closed state) when the determination result by itself corresponds to the determination by the other MCU (both determine that the measured distance is within the threshold).

An input circuit 120 includes a first safety input section 121, a second safety input section 122, a first unlock input section 123 and a second unlock input section 124. The first safety input section 121 and the second safety input section 122 are input circuits for being connected to other safety switches 1 in daisy chain. For example, the first safety input section 121 and the second safety input section 122 are respectively connected to a first OSSD 131 and a second OSSD 132 of another safety switch 1. OSSD is an abbreviation of an output signal switching device.

The first unlock input section 123 and the second unlock input section 124 are connected to external control devices such as a safety PLC and a safety control device, receiving signals outputted from external control devices. The first unlock input section 123 is connected to the first MCU 111 and outputs an input signal to the first MCU 111. The second unlock input section 124 is connected to the second MCU 112 and outputs an input signal to the second MCU 112. The safety determination circuit 144a of the first MCU 111 determines whether a first input signal inputted from the first unlock input section 123 is an OFF (lock) signal or not. Similarly, the safety determination circuit 144b determines whether a second input signal inputted from the second unlock input section 124 is the OFF (lock) signal or not and outputs a determination result to the first MCU 111. The safety determination circuit 144a of the first MCU 111 determines whether the first input signal is the OFF (lock) signal or not as well as whether the second input signal is the OFF (lock) signal or not. The safety determination circuit 144a makes the lock pin 34 in the lock state when the first input signal is the OFF (lock) signal as well as the second input signal is the OFF (lock) signal. For example, the first MCU 111 does not drive the solenoid 32 through a driving unit 145 to thereby make the lock pin 34 in the lock state due to the biasing force of the spring 31. When the safety determination circuit 144a of the first MCU 111 determines that the first input signal is an ON (unlock) signal or the second input signal is the ON (unlock) signal, the safety determination circuit 144a makes the lock pin 34 in an unlock state. For example, the lock pin 34 makes a transition to the unlock state by driving the solenoid 32 through the driving unit 145 to suck the solenoid pin 33.

Here, the first MCU 111 allows the lock pin 34 to make a transition to the lock state when the first input signal is OFF (lock) signal as well as the second input signal is OFF (lock) signal, however, a prerequisite is further added. The prerequisite is that both of the first MCU 111 and the second MCU 112 determine that the actuator 2 is in a close state. Accordingly, when any of the first MCU 111 and the second MCU 112 determines that the actuator 2 is in an open state, the first MCU 111 keeps the unlock state. In a case where inconsistency between the determination result by the safety determination circuit 144a concerning the open/close state of the actuator 2 and the determination result by the safety determination circuit 144b continues over a certain period of time or more, the safety determination circuit 144a determines the result as an error. In this case, the safety determination circuit 144a keeps the state of the solenoid 32 in a current state.

A detector 115 detects the position of the lock pin 34 (example: lock position, unlock position). For example, the detector 115 may be a photo interactive-type sensor having a light emitting device and a light receiving device. As shown in FIG. 5, the coupler 35 connected to the lock pin 34 has alight shielding plate, and the light shielding plate has the slit 36. As the lock pin 34 moves, the slit 36 also moves. When the slit 36 is positioned on the optical axis between the light emitting device and the light receiving device, the light receiving device can receive light (lock state). On the other hand, when the slit 36 is not positioned on the optical axis between the light emitting device and the light receiving device, the light receiving device is not capable of receiving light (unlock state). The detector 115 is connected to both of the first MCU 111 and the second MCU 112. The safety determination circuit 144a determines whether the lock pin 34 is in the lock state or in the unlock state based on a detection signal outputted from the detector 115, outputting a determination result to the safety determination circuit 144b. Similarly, the safety determination circuit 144b determines whether the lock pin 34 is in the lock state or in the unlock state based on a detection signal outputted from the detector 115, outputting a determination result to the safety determination circuit 114a. The safety determination circuit 144a outputs an ON signal through the first OSSD 131 of a switching device 130 when both of the determination result of the safety determination circuit 144a and the determination result of the safety determination circuit 144b indicate the lock state. The ON signal may be called a safety state signal, a safety signal or an operation permission signal. Similarly, the safety determination circuit 144b outputs the ON signal through the second OSSD 132 of the switching device 130 when both of the determination result of the safety determination circuit 144a and the determination result of the safety determination circuit 144b indicate the lock state. The safety determination circuit 144a outputs an OFF signal through the first OSSD 131 when any of the determination result of the safety determination circuit 144a and the determination result of the safety determination circuit 144b indicates the unlock state. The OFF signal may be called a non-safety state signal, non-safety signal or an operation non-permission signal. The safety determination circuit 144*b* outputs the OFF signal through the second OSSD 132 when any of the determination result of the safety determination circuit 144*a* and the determination result of the safety determination circuit 144*b* indicates the unlock state.

It is also possible that the state of the lock pin 34 is not considered. That is, the safety determination circuit 144*a* may control the first OSSD 131 only depending on the open/close state of the actuator 2. The safety determination circuit 144*b* may control the second OSSD 132 only depending on the open/close state of the actuator 2. That is, the safety determination circuit 144 may output the ON signal when the actuator 2 is in the close state and may output the OFF signal when the actuator 2 is in the open state not depending on the detection signal of the detector 115.

The first OSSD 131 and the second OSSD 132 may be configured by a PNP-type transistor. When the PNP-type transistor is turned on, a positive-side power supply is connected to an output terminal, therefore, the ON signal is outputted. On the other hand, when the PNP-type transistor is turned off, the output terminal is grounded through a pulldown resistance, the OFF signal is outputted.

An OSSD monitoring circuit 119 may be connected to the first OSSD 131 and the second OSSD 132 respectively. The OSSD monitoring circuit 119 is connected to the first MCU 111 and the second MCU 112. The first MUC 111 monitors whether the operation of the second OSSD 132 is normal or not through the OSSD monitoring circuit 119. The second MUC 112 monitors whether the operation of the first OSSD 131 is normal or not through the OSSD monitoring circuit 119. For example, the first OSSD 131 and the second OSSD 132 respectively allow the output signal to make a transition to OFF periodically for a short period of time when outputting the ON signal. The OSSD monitoring circuit 119 determines that the OSSD is normal when OFF for a short period of time can be detected during the output period of the ON signal and determines that the OSSD is not normal when OFF for a short period of time is not capable of being detected. The case where the ON signal is continued is caused by short circuit between the output terminal and the positive-side power supply. In this case, the safety determination circuits 144*a* and 144*b* respectively output a control signal for outputting the OFF signal to the first OSSD 131 and the second OSSD 132. Accordingly, any of the first OSSD 131 and the second OSSD 132 which is normal outputs the OFF signal. External devices can operate only while both of the first OSSD 131 and the second OSSD 132 output the ON signal. Therefore, the external devices are not operated while at least one of the first OSSD 131 and the second OSSD 132 outputs the OFF signal. The external devices are configured not to respond to the OFF for a short period of time in the ON signal.

A power supply circuit 125 is a DC-DC converter receiving supply of DC+24V and 0V from the outside and generates DC voltages such as DC+10V, +5V or +3.3V. The power supply circuit 125 supplies electric power to all circuits requiring electric power such as the control circuit 110, the antenna coil 21*a*, the solenoid 32 and the display unit 128. Incidentally, when a voltage supplied from an external power supply or a voltage outputted from the power supply circuit 125 is not within a prescribed range, there is a possibility that the control circuit 110 and the like do not operate normally. Accordingly, a power supply monitoring circuit 126 determines whether the voltage supplied from the external power supply is within a prescribed range or not as well as whether the voltage outputted from the power supply circuit 125 is within a prescribed range or not, outputting determination results to the first OSSD 131 and the second OSSD 132. The first OSSD 131 and the second OSSD 132 output the OFF signal respectively when the determination result indicating that the power supply circuit 125 does not operate normally is inputted, not depending on the control signal outputted from the control circuit 110. The first OSSD 131 and the second OSSD 132 output the ON signal or the OFF signal respectively when the determination result indicating that the power supply circuit 125 operates normally is inputted, depending on the control signal outputted from the control circuit 110.

The first safety input section 121 and the second safety input section 122 are respectively used for a cascade connection with respect to other safety switches 1. In a case where a plurality of doors are provided with respect to iron fences surrounding a hazard source, the hazard source is not capable of operating as far as all doors are in the safety state. The first MCU 111 is connected to the first safety input section 121. The first MCU 111 controls the first OSSD 131 based on the open/close state of the actuator 2 and the lock state of the lock pin 34 when the ON signal is inputted through the first safety input section 121. The first MCU 111 allows the first OSSD 131 to output the OFF signal when the OFF signal is inputted through the first safety input section 121, not depending on the open/close state of the actuator 2 and the lock state of the lock pin 34. Similarly, the second MCU 112 is connected to the second safety input section 122. The second MCU 112 controls the second OSSD 132 when the ON signal is inputted through the second safety input section 122 based on the open/close state of the actuator 2 and the lock state of the lock pin 34. The second MCU 112 allows the second OSSD 132 to output the OFF signal when the OFF signal is inputted through the second safety input section 122, not depending on the open/close state of the actuator 2 and the lock state of the lock pin 34. Accordingly, the cascade connection of the plural safety switches 1 can be performed. When any of the plural safety switch 1 is not in the safety state, the OFF signal is outputted to the external devices. When all the plural safety switches are in the safety state, the ON signal is outputted to external devices.

The display unit 128 includes a plurality of display lamps. A display control unit 143 turns on/off (or green/red) the large display lamps in accordance with the open/close state of the actuator 2, the lock/unlock state and so on. The display unit 143 turns on/off (or green/red) the small display lamps in accordance with OSSD outputs, INPUT signals, LOCK state/UNLOCK state and so on. OSSD outputs include an output signal of the first OSSD 131 and an output signal of the second OSSD 132.

The control circuit 110 may include an EDM function and an interlock (manual reset) function. EDM is an abbreviation of External Device Monitoring. The EDM function is a function of monitoring a contact welding of external devices (example: a conductor, relay and so on). In the EDM function, the ON signal is not outputted while welding of the external device occurs. The interlock function is a function of preventing the OSSD output from being changed from the OFF signal to the ON signal against intention of a user. The control circuit 110 keeps the OSSD output in the OFF signal when the state is changed into the interlock state even in a case where the hazard source managed by the safety switch 1 is in the safety state. The control circuit 100 releases the interlock state when detecting that a release button is pressed.

<Solenoid Lock Type>

The above-described lock pin 34 keeps the lock state by the biasing force of the spring 31 and makes a transition to the unlock state by the suction force of the solenoid 32. Specifically, the lock pin 34 is biased in +z-direction by the biasing force of the spring 31 and is sucked in −z-direction by the suction force of the solenoid 32. Such lock mechanism of the lock pin 34 is just an example. For example, a solenoid lock type may be adopted as the lock mechanism. The solenoid lock type is a lock mechanism in which the lock pin 34 makes a transition to the lock state by the suction force of the solenoid 32. That is, the lock pin 34 is biased in −z-direction by the biasing force of the spring 31 and is sucked in +z-direction by the suction force of the solenoid 32. In this case, the first unlock input section 123 functions as a first lock input section. The second unlock input section 124 functions as a second lock input section. The first MCU 111 controls the state of the lock pint 34 to be the unlock state by not driving the solenoid 32 when an input signal of the first lock input section is the OFF (unlock) signal as well as an input signal of the second lock section is the OFF (unlock) signal. For example, the spring 31 may pull the lock pin 34 so as to keep the lock pin 34 in the unlock state. The first MCU 111 controls the state of the lock pin 34 in the lock state by allowing electric current to flow in the solenoid 32 through the driving unit 145 when determining that the input signal of the first lock input section is the ON (lock) signal as well as the input signal of the second lock input section is the ON (lock) signal. The lock pin 34 is sucked by the solenoid 32 against the biasing force of the spring 31 to lock the actuator bolt 41.

The first MCU 111 controls the state of the lock pin 34 to be in the lock state when the input signal of the first lock input section is the ON (lock) signal and the input signal of the second lock input section is the ON (lock) signal as well as both of the first MCU 111 and the second MCU 112 determine that the actuator 2 is in the close state. When any of the first MCU 111 and the second MCU 112 determines that the actuator 2 is in the open state, the first MCU 111 controls the state of the lock pin 34 to be the unlock state. When inconsistency in the open/close state of the actuator continues over a certain period of time or more, the first MCU 111 and the second MCU 112 determine that an error occurs. The driving unit 145 may be provided both in the first MUC 111 and the second MCU 112. In this case, the first MCU 111 determines whether the input signal of the first lock input section is the ON (lock) signal or the OFF (unlock) signal, controlling the driving unit 145 of the first MUC 111 in accordance with the determination result. Similarly, the second MUC 112 determines whether the input signal of the second lock input section is the ON (lock) signal or the OFF (unlock) signal, controlling the driving unit 145 of the second MUC 112 in accordance with the determination result. The driving unit 145 of the first MCU 111 and the driving unit 145 of the second MCU 112 are connected to the solenoid 32 through a not-shown driving circuit. When the input signal of the first lock input section is the OFF (unlock) signal and the input signal of the second lock input section is the OFF (unlock) signal, the driving circuit does not drive the solenoid 32. Accordingly, the state of the lock pin 34 is controlled to be in the unlock state. When the input signal of the first lock input section is the ON (lock) signal or the input signal of the second lock input section is the ON (lock) signal, the driving circuit allows electric current to flow in the solenoid 32 to control the lock pin 34 in the lock state.

<Summary>

The safety switch 1 is a safety switch into and from which the bolt of the actuator 2 is inserted and pulled out. The body case 4 may be an example of an approximately rectangular parallelepiped casing as shown in FIG. 2A and the like. That is, the body case 4 is an example of a casing having a shape elongated along a first direction. The cap 3 is an example of a metal head provided on a first end side in the longitudinal direction of the casing. That is, the cap 3 is the example of the metal head having a receiving space for receiving the bolt of the actuator and provided on the first end side of the casing in the first direction. The detector 115 is an example of a detecting section for detecting a first state in which the bolt is received in the receiving space. The lock pin 34 and the like correspond to an example of a lock mechanism that switches between a lock state in which pull-out of the bolt in the first state is regulated and an unlock state in which pull-out of the bolt in the first state is allowed. The switching device 130 is an example of the circuit provided in the casing and outputting a signal indicating the safety state based on the safety state including the first state detected by the detector. As shown in FIG. 3E, the fourth side surface of the cap 3 is an example of a first attachment portion provided in the head and having a first attachment hole (screw hole 10e) into which the screw screwed to an external member is inserted. That is, the fourth side surface of the cap 3 is the example of the first attachment portion provided in the head and having the first attachment hole into which a first attachment member is inserted. As the attachment portion is formed in the cap 3 having the space for receiving the actuator bolt 41 as described above, both toughness and size reduction can be realized.

A force to pull out the actuator 2 from the safety switch 1 when the actuator bolt 41 is locked by the lock pin 34 is propagated from the lock pin 34 to the pipe 38, propagated from the pipe 38 to the neck portion 13, transferred from the neck portion 13 to the cap 3 and propagated from the cap 3 to the screw 72a of the first attachment hole. Drag generated by the screw 72a counters a pull-out force of the actuator 2. At this time, the closer a distance between the first attachment hole and the lock pin 34 seen from the pull-out direction, the smaller moment is generated. The farther the distance is, the larger moment is generated. Therefore, the attachment portion is formed in the cap 3 having the space receiving the actuator bolt 41, the attachment portion and a lock bolt locking portion become relatively closer, and the moment of the force is reduced with respect to the force to pull out the actuator 2 in the lock state. The moment of the force may be substantially received by the cap 3. Accordingly, portions to have toughness can be limited to the periphery of the cap 3 and further, the body case 4 can be molded by a nonmetallic member, which can achieve size reduction of the safety switch 1.

When focusing on transmission of the force, a first force transmission path (the lock pin 34 to the pipe 38 to the neck portion 13 to the cap 3 to the screw of the first attachment hole), and, or instead of, a second force transmission path (the lock pin 34 to the latch pin 82 to the cap 3 to the screw of the first attachment hole) may be considered. In either case, toughness around the cap 3 is important. Therefore, the neck portion 13 and the pipe 38 will be important from a viewpoint of toughness. However, it is also preferable that the hole 14 is formed in the cap 3 and the lock pin 14 is inserted through the hole 14 so that the force to the lock pin 34 is directly transmitted to the cap 3.

The fixing member 5 is an example of a metal bottom portion provided on a second end side in the longitudinal direction of the casing. The fourth side surface of the fixing member 5 is an example of a second attachment portion provided in the bottom portion and having a second attachment hole (screw hole 10*d*) into which a screw screwing to an external member is inserted. That is, the fourth side surface is the example of the second attachment portion provided in the bottom portion and having the second attachment hole into which a second attachment member is inserted. As shown in FIG. 3B and FIG. 3D, a first attachment surface abutting on the external member provided in the first attachment portion and a second attachment surface abutting on the external member provided in the second attachment portion may be almost parallel to each other. As shown in FIG. 3E, a position of the first attachment hole may be a central position in a short-side direction of the casing. As shown in FIG. 3E, a position of the second attachment hole may be a central position in the short-side direction of the casing. The body of the safety switch 1 is fixed to an aluminum frame in many cases. A groove portion is provided in the center in a short-side direction on four side surfaces of the aluminum frame. A hexagonal nut or the like can be housed in the groove portion. Therefore, the safety switch 1 is easily fixed to the aluminum frame or the like by the screw inserted into the first attaching hole. Similarly, the safety switch 1 is easily fixed to the aluminum frame or the like by the screw inserted into the second attaching hole.

As shown in FIG. 4, the window 19 is an example of a window provided on a first surface of the casing. The window cover 6 is an example of a resin cover that covers the window. As explained by using FIG. 4, the cap 3 functioning as the head may have a space (receiving holes 8*a*, 8*b* and 8*c*) into which the bolt of the actuator 2 is inserted. The body case 4 functioning as the casing may accommodate a wireless circuit (example: antenna coil 21*a*) provided at a position facing the wireless tag (example: antenna coil 21*b*) provided in the actuator 2 with the window sandwiched therebetween, which supplies electric power to the wireless tag and receives a signal transmitted from the wireless tag. The transponder 128 and the antenna coil 21*b* may be arranged in a housing hole provided in the actuator bolt 41.

As shown in FIG. 5, the hole 14 is an example of a lock pin hole provided on a top surface of the casing to which the head is attached, which is the lock pin hole into which the lock pin 34 for locking the bolt is inserted. The solenoid 32 and so on correspond to an example of a driving mechanism housed in the casing, which is the driving mechanism that drives the lock pin 34.

The circuit substrate 20 is an example of a circuit substrate on which a wireless circuit is realized. An output circuit having the switching device 130 that outputs a signal indicating the safety state as the state in which the bolt is locked by the lock pin may be mounted on the circuit substrate 20.

As shown in FIG. 4 and FIG. 5, the cap 3 is fitted to the neck portion 13 provided in the casing and supported so as to rotate freely by the neck portion 13. Accordingly, the user can change an attaching surface easily. For example, the cap 3 as the head may have a rotation axis parallel to the longitudinal direction of the casing as shown in FIG. 4. The cap 3 may be attached to a cylindrical member (example: neck portion 13) protruding in the longitudinal direction from the case so as to rotate freely. Accordingly, the attachment surface to the door frame 102 or the like can be easily changed. As shown in FIG. 5, the hole 14 as the lock pin hole may be provided in the cylindrical member. It is sufficient that the neck portion 13 is a neck portion protruding in the longitudinal direction and is axially symmetric to the rotation axis, therefore, the neck portion 13 may have a square pole shape. Accordingly, the cap 3 may be attached to the neck portion 13 so as to be attached at any of different plural rotation angles (examples: 0 degree, 90 degrees, 180 degrees and 270 degrees) with respect to the casing.

The cap 3 as the head may have three receiving holes 8*a* to 8*c* for receiving the bolt from at least three directions. It is not always necessary that the receiving holes 8*a* to 8*c* have a complete circular shape as shown in FIG. 3B or FIG. 3D. An opening area of the receiving holes 8*a* to 8*c* is increased by further cutting part of the circular shape. In particular, when a cutout is added to a circumference close to the fourth surface as the attachment surface, the user can visually recognize an attachment state of the screw 72*a* easily. The first attachment hole may communicate with the receiving space in the head. This enables the first attachment hole to be close to the actuator bolt 41. When the first attachment hole becomes close to the actuator bolt 41, the moment caused by the pull-out force of the actuator bolt 41 is reduced.

As shown in FIG. 7. the actuator bolt 41 may be supported by an elastic member such as the spring 45 or the bellows 40. Accordingly, the actuator bolt 41 can move with respect to the actuator housing 42.

The cable 11 is an example of a cable transmitting the signal indicating the safety state. As shown in FIGS. 3B to 3E, the cable 11 may be led out from the second end side of the casing at a position apart from a straight line passing the center of the second attachment hole so that the second attachment member inserted into the second attachment hole does not interfere with the cable 11. The bottom portion may have two or more second attachment holes (examples: 10*a*, 10*c* and 10*d*) into which the second attachment member can be inserted. The cable 11 may be led out from the second end side of the casing at a position apart from straight lines passing respective centers of the two or more second attachment holes.

As shown in FIG. 3C, the center of the screw hole 10*e* may correspond to the center of the receiving hole 8*b*. Accordingly, when the screw inserted into the screw hole 10*e* is fixed, a screwdriver can be inserted from the receiving hole 8*b* to be rotated. Additionally, the height of the cap 3 can be reduced.

The unlock members 7*a* and 7*b* correspond to an example of a releasing mechanism for releasing locking between the bolt and the lock pin.

Figure 16:
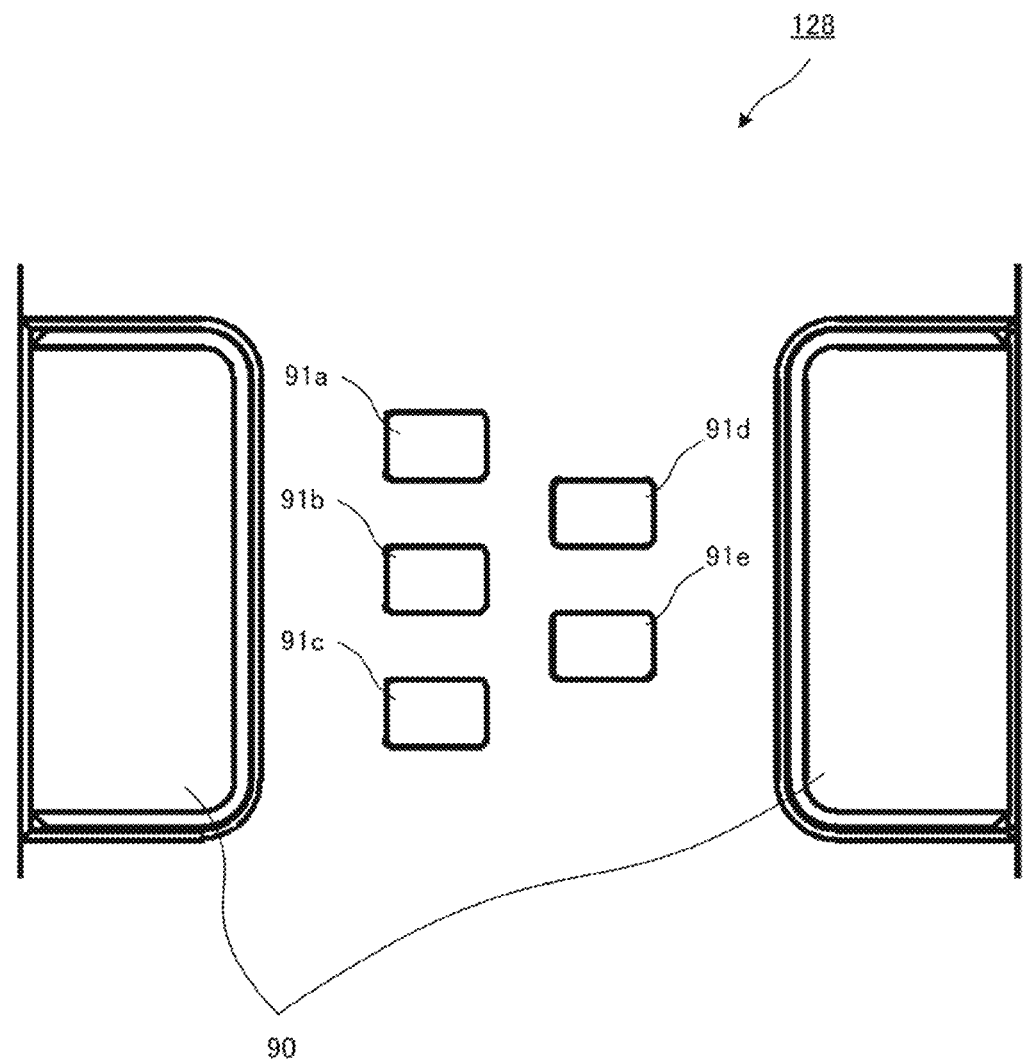
FIG. 16 is a view for explaining a display unit.

FIG. 16 shows the details of the display unit 128. The large display lamps 90 are turned off when electric power is not supplied from the external power supply and are lit green or blink in red when electric power is supplied. The OSSD display lamp 91*a* is lit red or is lit green in accordance with the OSSD output. The state display lamp 91*b* is lit yellow when there is no external input. The mode display lamp 91*c* is lit green in accordance with the operation mode. The lock display lamp 91*d* is lit green when a lock signal is inputted or other cases. The unlock display lamp 91*e* is lit green when an unlock signal is inputted or other cases.

(When the OSSD Output is Set in a Lock Interlocking Mode)

When electric power is supplied from the external power supply, the large display lamps 90 are lit green. At this moment, five small display lamps are not lit. When the actuator bolt 41 is in the open state and there is no external input and no lock signal after power supply input is completed, the large display lamps 90 are lit red, the OSSD display lamp 91*a* is lit red, the state display lamp 91*b* is lit yellow, the mode display lamp 91c and the lock display lamp 91d are turn off and the unlock display lamp 91e is lit red.

When the actuator bolt 41 makes a transition from the open state to the close state but there is no external input and no lock signal, the large display lamps 90 are lit orange. The OSSD display lamp 91a is lit red, the state display lamp 91b is lit yellow, the mode display lamp 91c and the lock display lamp 91d are turned off and the unlock lamp 91e is lit red.

When the actuator bolt 41 is in the close state, there is an external input as well as there is no lock signal, the large display lamps 90 are lit orange. The OSSD display lamp 91a is lit red, the state display lamp 91b is turned off, the mode display lamp 91c and the lock display lamp 91d are turned off and the unlock display lamp 91e is lit red.

When the actuator bolt 41 is in the close state, there is an external input as well as there is the lock signal, the large display lamps 90 are lit green. The OSSD display lamp 91a is lit green. The state display lamp 91b and the mode display lamp 91c are turned off. The lock display lamp 91d is lit green. The unlock display lamp 91e is turned off. Not that the mode display lamp 91c is lit green in accordance with the operation mode. More specifically, the operation mode may be set to any of a lock interlocking mode as a mode in which the OSSD output is interlocked with the locking and an open/close interlocking mode as a mode in which the OSSD output is interlocked with open/close of the door. The mode display lamp 91c is turned off when the operation mode is set to the lock interlocking mode and is lit green when the operation mode is set to the open/close interlocking mode.

Incidentally, the unlock members 7a and 7b can forcibly move the lock pin 34 from the lock position to the unlock position. In this case, the large display lamps 90 are lit green and orange alternately. The OSSD display lamp 91a is lit red as the lock pin 34 is released. The state display lamp 91b, the mode display lamp 91c and the lock display lamp 91d are turned off. The unlock display lamp 91e is lit red. Accordingly, it is found that the lock pin 34 has been forcibly released although the actuator bolt 41 is inserted into the cap 3 and there is the external input as well as the lock signal is inputted.

(When the OSSD Output is Set in the Open/Close Interlocking Mode)

When electric power is supplied from the external power supply, the large display lamps 90 are lit green. At this moment, five small display lamps are not lit.

When the actuator bolt 41 is in the open state and there is no external input and no lock signal after power supply input is completed, the large display lamps 90 are lit red, the OSSD display lamp 91a is lit red, the state display lamp 91b is lit yellow, the mode display lamp 91c is lit green, the lock display lamp 91d is turned off and the unlock display lamp 91e is lit red.

When there is an external input as well as there is no lock signal though the actuator bolt 41 is in the open state, the large display lamps 90 are lit red. The OSSD display lamp 91a is lit red, the state display lamp 91b is turned off, the mode display lamp 91c is lit green, the lock display lamp 91d is turned off and the unlock display lamp 91e is lit red.

When the actuator bolt 41 makes a transition from the open state to the close state, there is an external input and there is no lock signal, the large display lamps 90 are lit orange. The OSSD display lamp 91a is lit green, the state display lamp 91b is turned off, the mode display lamp 91c is lit green, the lock display lamp 91d is turned off and the unlock display lamp 91e is lit red.

When the actuator bolt 41 is in the open state, there is an external input and there is a lock signal, the large display lamps 90 are lit green. The OSSD display lamp 91a is lit green. The state display lamp 91b is turned off. The mode display lamp 91c is lit green. The lock display lamp 91d is lit green. The unlock display lamp 91e is turned off.

The body of the safety switch 1 and the actuator 2 may make a pair. If the actuator 2 not making a pair with the body of the safety switch 1 is inserted, the large display lamps 90 may blink in orange.

As described above, the large display lamps 90 and the OSSD display lamp 91a are examples of first display lamps turning on and off in conjunction with the signal outputted from the output circuit. The lock display lamp 91d and the unlock display lamp 91e are examples of second display lamps displaying the state where the actuator bolt 41 is locked by the lock pin 34 and the state where the actuator bolt 41 is not locked so as to be discriminated with each other.

As shown in FIG. 11 to FIG. 13, the lock pin 34 moves between a first position where pull-out of the actuator bolt 41 is regulated and a second position where pull-out of the bolt is allowed.

The unlock members 7a and 7b functioning as the releasing mechanism are a mechanism moving the lock pin from the first position to the second position.

The solenoid 32 is an example of a driving mechanism for moving the lock pin 34 from the second position to the first position. The solenoid 32 may be replaced with a motor.

As shown in FIG. 11 to FIG. 13, the releasing mechanism such as the unlock members 7a and 7b may be provided so as to be operated from at least two facing side surfaces of the four side surfaces forming the casing.

Figure 17A:
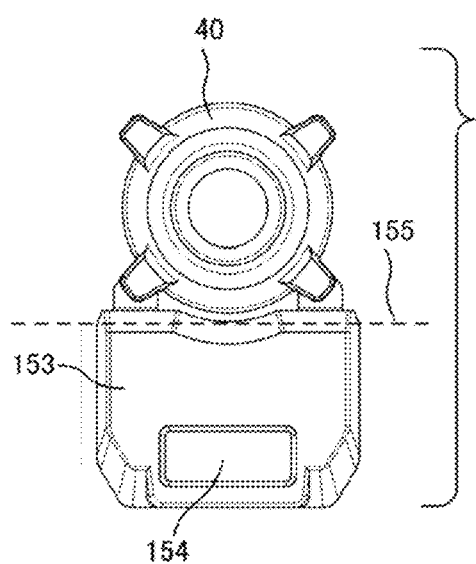
FIGS. 17A to 17D are views for explaining a buffer cover.
Figure 17B:
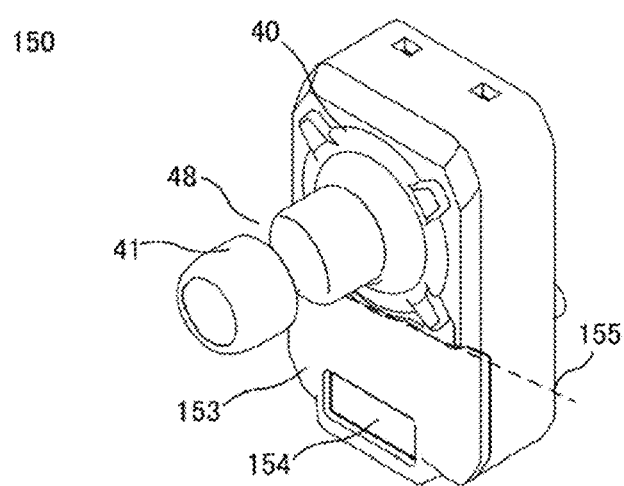
Figure 17C:
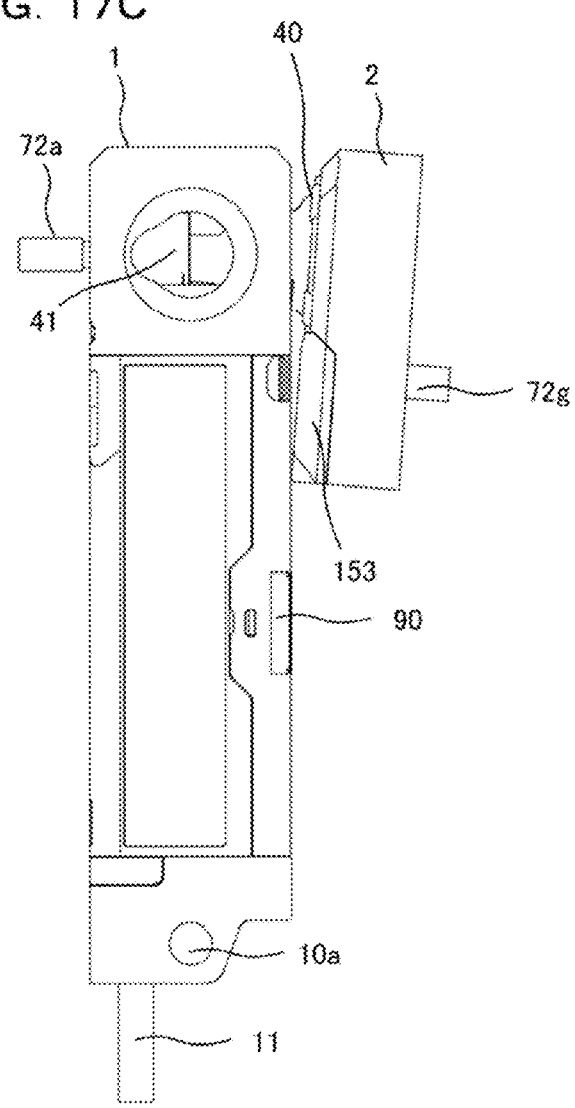
Figure 17D:
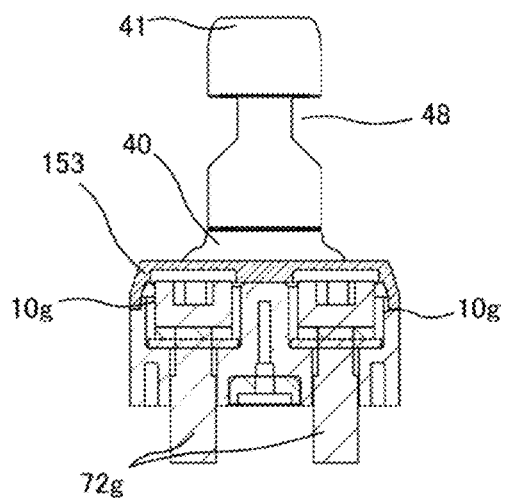

FIG. 17A shows a bellows assembly 150 including the bellows 40. FIG. 17B shows the actuator 2 to which the bellows assembly 150 is attached. FIG. 17C shows a relation between the safety switch 1 and the actuator 2. FIG. 17D is a cross-sectional view in the vicinity of the screw holes 10g. The bellows assembly 150 includes the bellows 40 and a buffer cover 153. The buffer cover 153 has a rectangular opening 154. The opening 154 corresponds to the position of the antenna coil 21b. That is, when the opening 154 is provided in the bellows assembly 150, attenuation of electromagnetic waves incident on the antenna coil 21 and attenuation of electronic waves radiated from the antenna coil 21b are reduced. The bellows assembly 150 is formed of rubber and resin having flexibility. For example, when the bellows assembly 150 is folded in an L-shape along a folding line 155, a screw 72g and the screw hole 10g hidden under the buffer cover 153 are exposed. The buffer cover 153 protects the screw 72g and the screw hole 10g in this manner. Moreover, as shown in FIG. 17C, the buffer cover 153 can alleviate contact between the safety switch 1 and the actuator 2. As the actuator bolt 41 is elastically supported as described above, a posture of the actuator bolt 41 can be changed. Accordingly, the safety switch 1 may contact the actuator 2 depending on the posture of the actuator bolt 41. Therefore, the buffer cover 153 is effective for reducing impact due to the contact. It is also preferable that the bellows 40 and the buffer cover 153 are not integrated and separate from each other. However, when the bellows 40 and the buffer cover 153 are integrated, it is possible to prevent the buffer cover 153 from falling off due to opening/closing.

What is claimed is:

1. A safety switch into and from which a bolt of an actuator is inserted and pulled out, comprising:
    a casing having a shape elongated along a first direction;
    a metal head coupled to a first end side of the casing in the first direction, and having a receiving space for receiving the bolt of the actuator;
    a detector for detecting a first state in which the bolt is received in the receiving space;
    a lock mechanism, in a lock state, disposed at a lock position and regulating pull-out of the bolt in the first state, and, in an unlock state, disposed at an unlock position and allowing pull-out of the bolt in the first state, the lock mechanism being switchable between the lock position and the unlock position;
    a switching device disposed in the casing and outputting a safety signal indicating a safety state based on the first state detected by the detector; and
    a first attachment portion disposed in the metal head and having a first attachment hole into which a first attachment member is inserted.

2. The safety switch according to claim 1,
    wherein the detector includes a wireless circuit supplying electric power to a wireless tag provided in the actuator and receiving a wireless signal transmitted from the wireless tag.

3. The safety switch according to claim 2,
    wherein the lock mechanism includes
    a lock pin locking the bolt, and
    a driving mechanism housed in the casing and driving the lock pin, and
    a lock pin hole into which the lock pin for locking the bolt is inserted is formed on a top surface of the casing to which the metal head is attached.

4. The safety switch according to claim 3, further comprising:
    a circuit substrate on which the wireless circuit is mounted,
    wherein an output circuit having the switching device that outputs the safety signal indicating the safety state as the state in which the bolt is locked by the lock pin is mounted on the circuit substrate.

5. The safety switch according to claim 1,
    wherein the metal head has a rotation axis parallel to the first direction,
    the casing has a neck portion protruding in the first direction and is axially symmetric to the rotation axis, and
    the metal head is attached to the neck portion so as to be attached at any of different plural rotation angles with respect to the casing.

6. The safety switch according to claim 1,
    wherein the metal head includes three receiving holes for receiving the bolt from at least three directions.

7. The safety switch according to claim 1,
    wherein the first attachment hole communicates with the receiving space in the metal head.

8. The safety switch according to claim 1, further comprising:
    a metal bottom portion provided on a second end side in the first direction of the casing; and
    a second attachment portion provided in the bottom portion and having a second attachment hole into which a second attachment member is inserted.

9. The safety switch according to claim 8,
    wherein a first attachment surface abutting on the first attachment member provided in the first attachment portion and a second attachment surface abutting on the second attachment member provided in the second attachment portion are parallel to each other,
    a first position of the first attachment hole is a first central position in a short-side direction of the casing, and
    a second position of the second attachment hole is a second central position in the short-side direction of the casing.

10. The safety switch according to claim 9, further comprising:
    a cable transmitting the safety signal indicating the safety state,
    wherein the cable is led out from the second end side of the casing at a third position apart from a straight line passing the center of the second attachment hole so that the second attachment member inserted into the second attachment hole does not interfere with the cable.

11. The safety switch according to claim 10,
    wherein the bottom portion includes two or more second attachment holes into which the second attachment member is capable of being inserted, and
    the cable is led out from the second end side of the casing at the third position apart from straight lines passing respective centers of the two or more second attachment holes.

* * * * *